US012640866B2

(12) United States Patent
Khoshnevisan et al.

(10) Patent No.: US 12,640,866 B2
(45) Date of Patent: May 26, 2026

(54) PORT NUMBER AND RESOURCE SET MAPPING

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/817,246

(22) Filed: Aug. 3, 2022

(65) Prior Publication Data

US 2024/0048305 A1     Feb. 8, 2024

(51) Int. Cl.
*H04L 5/00*          (2006.01)
*H04W 72/23*         (2023.01)

(52) U.S. Cl.
CPC ........... *H04L 5/0048* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2013/0070732 A1* | 3/2013 | Noh | ........................ | H04J 13/18 370/335 |
| 2022/0239410 A1* | 7/2022 | Lim | ...................... | H04L 5/0048 |

| | | | | |
|---|---|---|---|---|
| 2023/0063015 A1* | 3/2023 | Muruganathan | ...... | H04W 72/23 |
| 2024/0063977 A1* | 2/2024 | Guo | ...................... | H04L 5/0044 |
| 2024/0155606 A1* | 5/2024 | Wang | ................... | H04B 7/0456 |
| 2025/0048359 A1* | 2/2025 | Zhang | ................... | H04L 5/0053 |

OTHER PUBLICATIONS

International Search Report and Written Opinion—PCT/US2023/071020—ISA/EPO—Jan. 23, 2024.
Fraunhofer Iis, et al., "Enhancements on Multi-Beam Operation", 3GPP TSG RAN WG1 Meeting #107-e, R1-2111169, 3rd Generation Partnership Project, Mobile Competence Centre, 650, Route Des Lucioles, F-06921 Sophia-Antipolis Cedex, France, vol. RAN WG1, No. E-meeting, Nov. 11, 2021-Nov. 19, 2021, Nov. 5, 2021, XP052074151, 6 pages, sections 3, 3.1.
Fraunhofer Iis, et al., "Remaining Issues in Enhancements on Multi-Beam Operation", 3GPP TSG RAN WG1 Meeting #108-e, R1-2201425, 3rd Generation Partnership Project, Mobile Competence Centre, 650, Route Des Lucioles, F-06921 Sophia-Antipolis Cedex, France, vol. RAN WG1, No. E-meeting, Feb. 21, 2022-Mar. 3, 2022, Feb. 14, 2022, XP052109480, 10 pages, sections 3.1, 3.2.

(Continued)

*Primary Examiner* — Christine T Duong
(74) *Attorney, Agent, or Firm* — Harrity & Harrity, LLP

(57)          ABSTRACT

Various aspects of the present disclosure generally relate to wireless communication. In some aspects, a user equipment (UE) may receive an indication of a mapping of port numbers to sounding reference signal (SRS) resources of a first resource set and a second resource set, where port numbers of the first resource set and port numbers of the second resource set are uniquely indicated. The UE may transmit an uplink communication based at least in part on the indication. Numerous other aspects are described.

30 Claims, 15 Drawing Sheets

(56) References Cited

OTHER PUBLICATIONS

Fraunhofer Iis, et al., "UE Panel-Specific UL Transmission", 3GPP Draft, R1-1900359, AH3GPP TSG RAN WG1 Meeting-1901, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21m 2019-Jan. 25, 2019, Jan. 20, 2019 (Jan. 20, 2019), XP051593273, 5 Pages, Setion 2.

NTT Docomo, et al., "Discussion on SRS Enhancement", 3GPP TSG RAN WG1 #104-e, R1-2101602, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971757, 14 pages, figures 2-2, 2-3, 2-4, 4-1, 5-1, 5-2(b), 5-3(b), sections 2.1, 2.2, 3.2, 4, 5.1, 5.2.

Partial International Search Report—PCT/US2023/071020—ISA/EPO—Nov. 29, 2023.

* cited by examiner

400

1000

1210 Receive an indication of a mapping of port numbers to sounding reference signal (SRS) resources of a first resource set and a second resource set, wherein port numbers of the first resource set and port numbers of the second resource set are uniquely indicated 1220 Transmit an uplink communication based at least in part on the indication

1200

1310 — Transmit an indication of a mapping of port numbers to sounding reference signal (SRS) resources of a first resource set and a second resource set, wherein port numbers of the first resource set and port numbers of the second resource set are uniquely indicated 1320 — Receive, from a user equipment (UE), an uplink communication based at least in part on the indication

1300

1500

Reception Component 1502

Communication Manager 1508

Transmission Component 1504

1506

PORT NUMBER AND RESOURCE SET MAPPING

FIELD OF THE DISCLOSURE

Aspects of the present disclosure generally relate to wireless communication and to techniques and apparatuses for port number and resource set mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a mapping of port numbers to sounding reference signal (SRS) resources of a first resource set and a second resource set, wherein port numbers of the first resource set and port numbers of the second resource set are uniquely indicated. The method may include transmitting an uplink communication based at least in part on the indication.

Some aspects described herein relate to a method of wireless communication performed by a network node. The method may include transmitting an indication of a mapping of port numbers to SRS resources of a first resource set and a second resource set, wherein port numbers of the first resource set and port numbers of the second resource set are uniquely indicated. The method may include receiving, from a UE, an uplink communication based at least in part on the indication.

Some aspects described herein relate to a UE for wireless communication. The user equipment may include a memory and one or more processors coupled to the memory. The one or more processors may be configured to receive an indication of a mapping of port numbers to SRS resources of a first resource set and a second resource set, wherein port numbers of the first resource set and port numbers of the second resource set are uniquely indicated. The one or more processors may be configured to transmit an uplink communication based at least in part on the indication.

Some aspects described herein relate to a network node for wireless communication. The network node may include a memory and one or more processors coupled to the memory. The one or more processors may be configured to transmit an indication of a mapping of port numbers to SRS resources of a first resource set and a second resource set, wherein port numbers of the first resource set and port numbers of the second resource set are uniquely indicated. The one or more processors may be configured to receive, from a UE, an uplink communication based at least in part on the indication.

Some aspects described herein relate to a non-transitory computer-readable medium that stores a set of instructions for wireless communication by a UE. The set of instructions, when executed by one or more processors of the UE, may cause the UE to receive an indication of a mapping of port numbers to SRS resources of a first resource set and a second resource set, wherein port numbers of the first resource set and port numbers of the second resource set are uniquely indicated. The set of instructions, when executed by one or more processors of the UE, may cause the UE to transmit an uplink communication based at least in part on the indication.

Some aspects described herein relate to a non-transitory computer-readable medium that stores a set of instructions for wireless communication by a network node. The set of instructions, when executed by one or more processors of the network node, may cause the network node to transmit an indication of a mapping of port numbers to SRS resources of a first resource set and a second resource set, wherein port numbers of the first resource set and port numbers of the second resource set are uniquely indicated. The set of instructions, when executed by one or more processors of the network node, may cause the network node to receive, from a UE, an uplink communication based at least in part on the indication.

Some aspects described herein relate to an apparatus for wireless communication. The apparatus may include means for receiving an indication of a mapping of port numbers to SRS resources of a first resource set and a second resource set, wherein port numbers of the first resource set and port numbers of the second resource set are uniquely indicated. The apparatus may include means for transmitting an uplink communication based at least in part on the indication.

Some aspects described herein relate to an apparatus for wireless communication. The apparatus may include means for transmitting an indication of a mapping of port numbers to SRS resources of a first resource set and a second resource set, wherein port numbers of the first resource set and port numbers of the second resource set are uniquely indicated. The apparatus may include means for receiving, from a UE, an uplink communication based at least in part on the indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
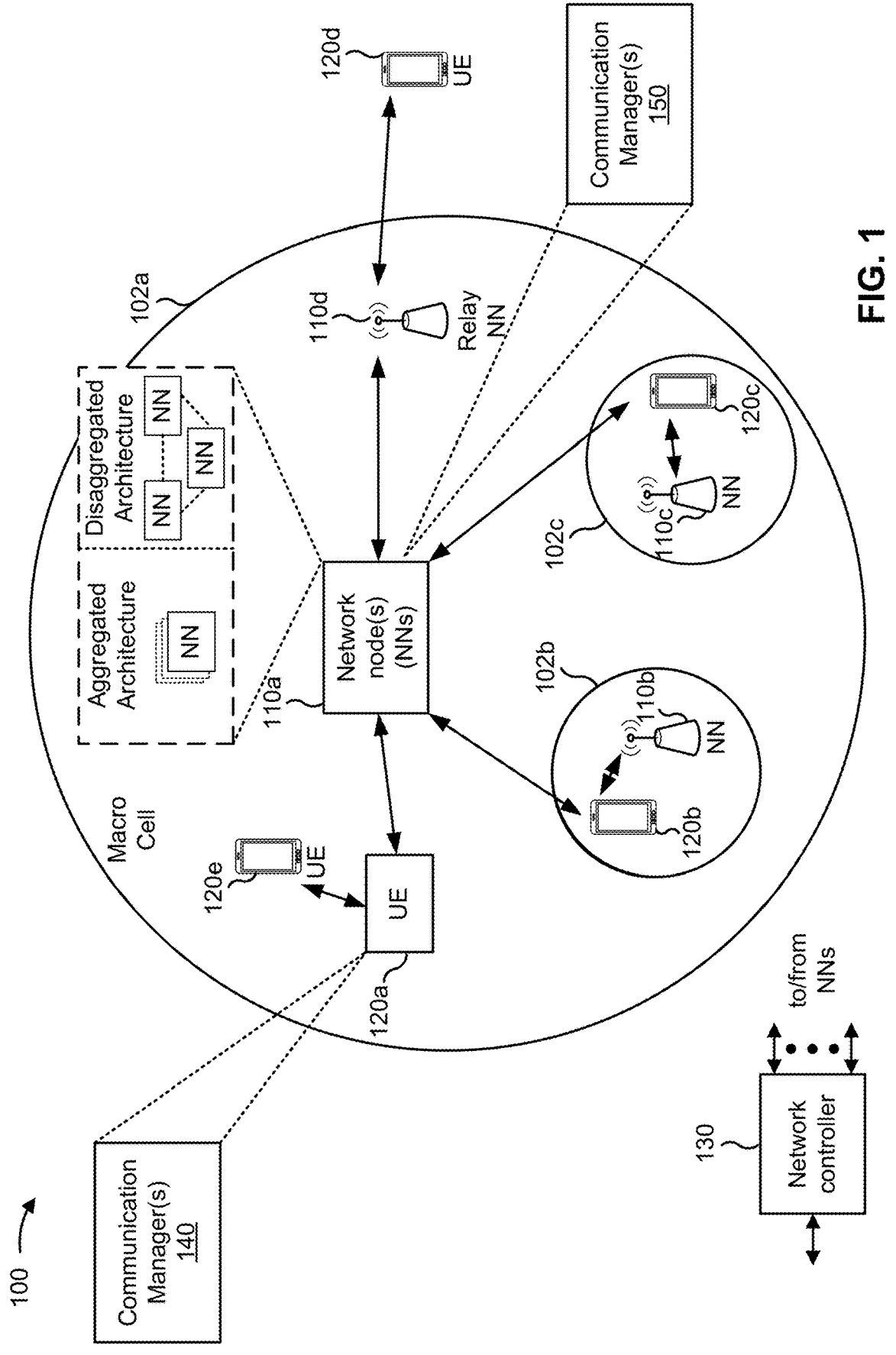
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a mapping of port numbers to SRS resources of a first resource set and a second resource set, wherein port numbers of the first resource set and port numbers of the second resource set are uniquely indicated; and transmit an uplink communication based at least in part on the indication. Additionally, or alternatively, the communication manager 140 may perform one or more other operations described herein.

In some aspects, the network node may include a communication manager 150. As described in more detail elsewhere herein, the communication manager 150 may transmit an indication of a mapping of port numbers to SRS resources of a first resource set and a second resource set, wherein port numbers of the first resource set and port numbers of the second resource set are uniquely indicated; and receive, from a UE, an uplink communication based at least in part on the indication. Additionally, or alternatively, the communication manager 150 may perform one or more other operations described herein.

As indicated above, FIG. 1 is provided as an example. Other examples may differ from what is described with regard to FIG. 1.

Figure 2:
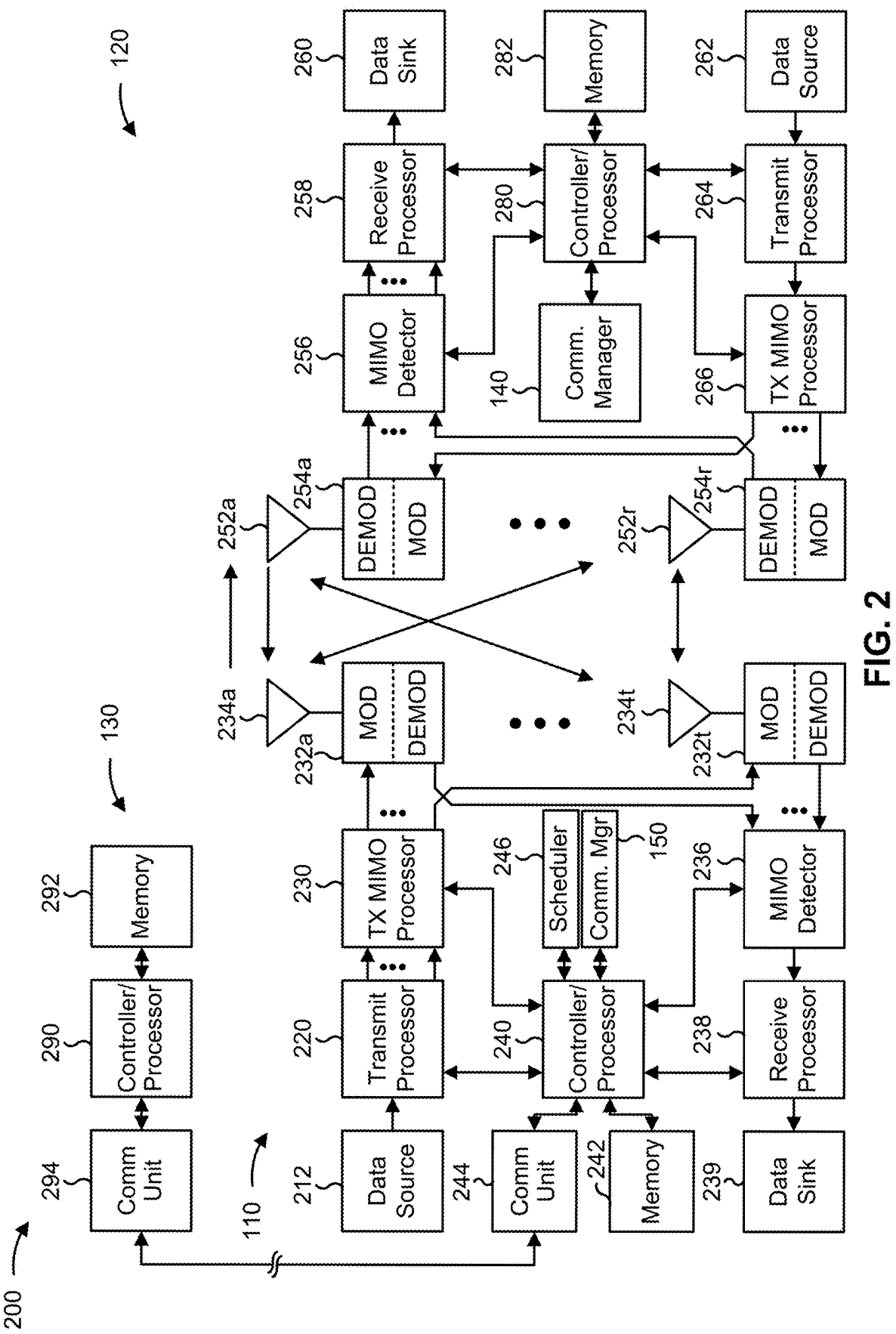
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 10-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 10-15).

The controller/processor 240 of the network node 110, the controller/processor 280 of the UE 120, and/or any other component(s) of FIG. 2 may perform one or more techniques associated with port number and resource set mapping, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE includes means for receiving an indication of a mapping of port numbers to SRS resources of a first resource set and a second resource set, wherein port numbers of the first resource set and port numbers of the second resource set are uniquely indicated; and/or means for transmitting an uplink communication based at least in part on the indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication of a mapping of port numbers to SRS resources of a first resource set and a second resource set, wherein port numbers of the first resource set and port numbers of the second resource set are uniquely indicated; and/or means for receiving, from a UE, an uplink communication based at least in part on the indication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
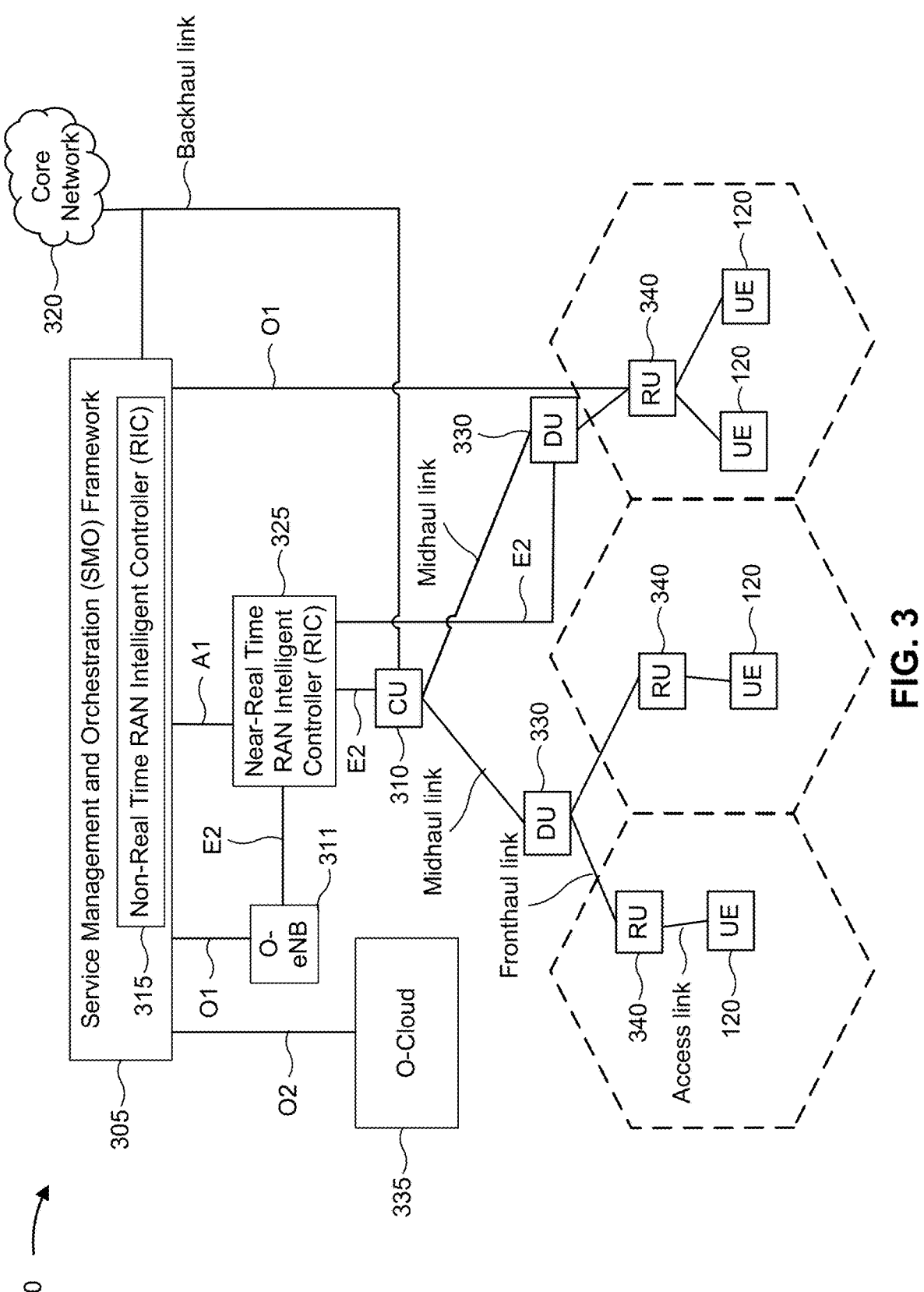
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
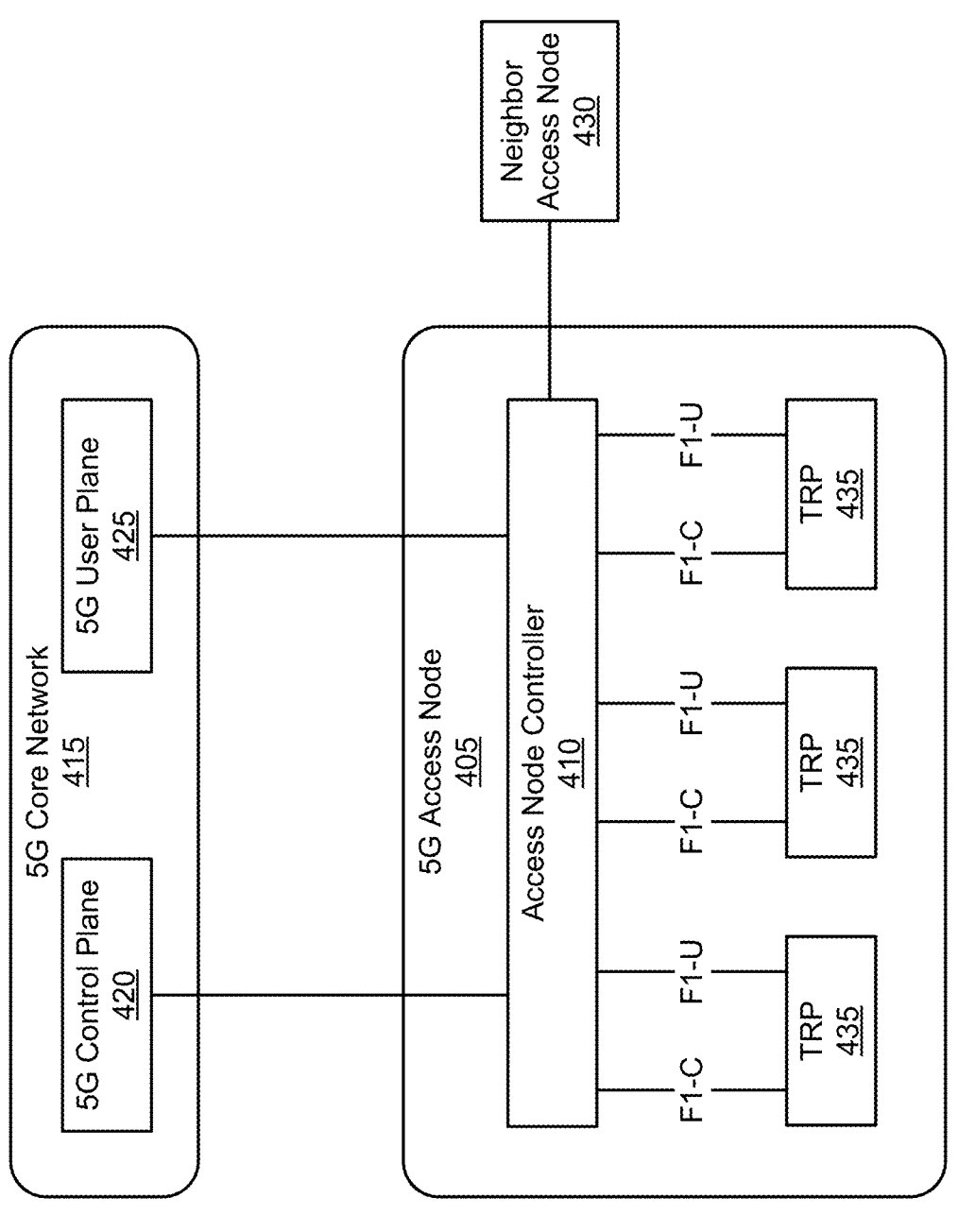
FIG. 4 illustrates an example logical architecture of a distributed radio access network (RAN), in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may include a DU and/or an RU of the distributed RAN 400. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400, referred to elsewhere herein as a functional split. For example, a PDCP layer, an RLC layer, and/or a medium access control (MAC) layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
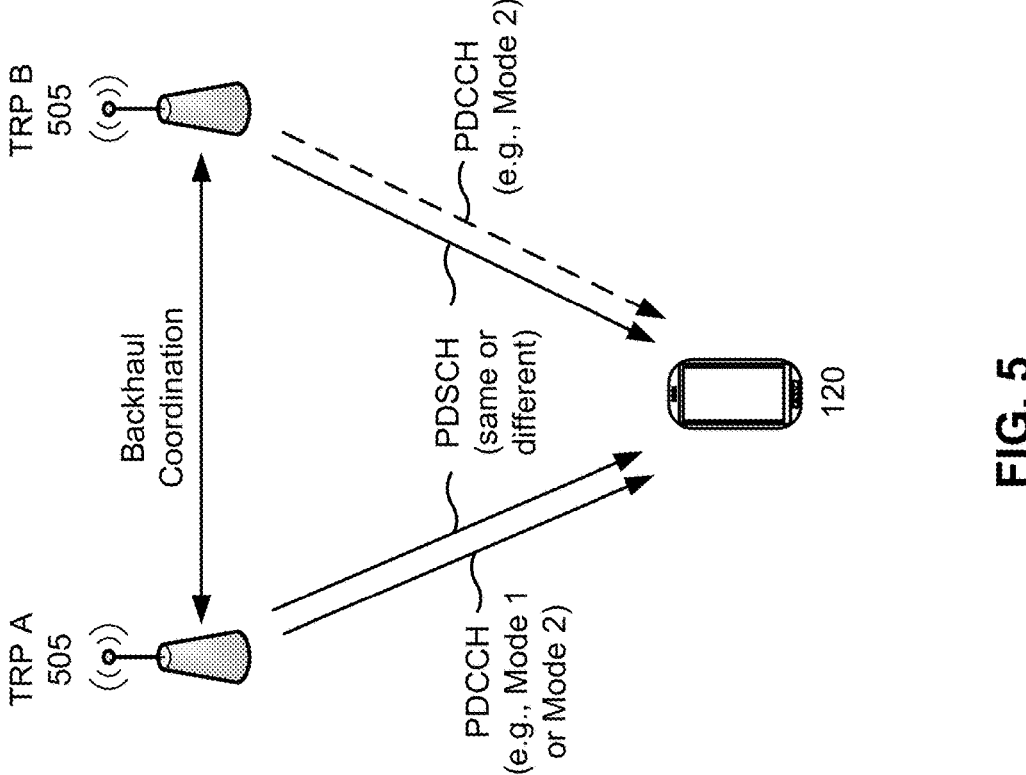
FIG. 5 is a diagram illustrating an example of multi-transmission reception point (TRP) communication (sometimes referred to as multi-panel communication), in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same network node 110 (e.g., when the TRPs 505 are different antenna arrays or panels of the same network node 110), and may have a larger delay and/or lower capacity (as compared to co-location) when the TRPs 505 are located at different network nodes 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
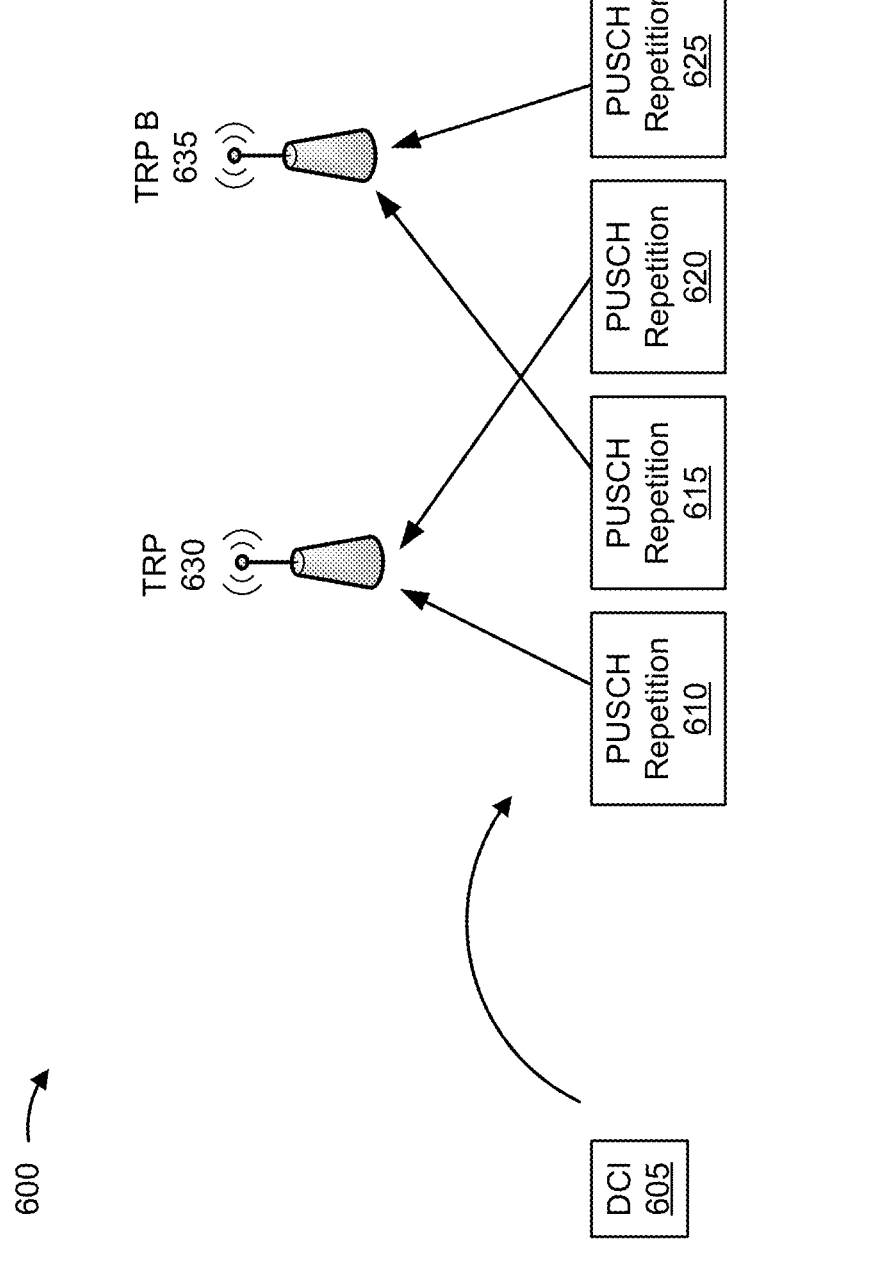
FIG. 6 is a diagram illustrating an example of multi-TRP communication (sometimes referred to as multi-panel communication), in accordance with the present disclosure.

FIG. 6 is a diagram illustrating an example 600 of multi-TRP communication (sometimes referred to as multi-panel communication), in accordance with the present disclosure. In context of FIG. 6, a UE may communicate with multiple TRPs of a network node.

As shown in FIG. 6, a DCI 605 may schedule a physical uplink shared channel (PUSCH) communication with repetitions that are transmitted to multiple TRPs. For example, the DCI may schedule the UE to transmit a PUSCH repetition 610, a PUSCH repetition 615, a PUSCH repetition 620, and a PUSCH repetition 625, as shown. The PUSCH repetition 610 and the PUSCH repetition 620 may be transmitted to a TRP 630 and the PUSCH repetition 615 and the PUSCH repetition 625 may be transmitted to a TRP 635. The repetitions may be associated with a single transport block (TB).

In some examples, the DCI may schedule the PUSCH repetitions in a time-domain multiplexing (TDM) configuration (e.g., the PUSCH repetitions do not overlap in time). Additionally, or alternatively, the DCI may schedule the PUSCH repetitions with different transmission parameters, such as beams, spatial relations, TCI states, power control parameters, and/or precoding.

In some networks, the PUSCH repetitions may be grouped into two sets, with each set being configured with a set of transmission parameters. For example, the PUSCH repetition 610 and the PUSCH repetition 620 may be part of a first set and the PUSCH repetition 615 and the PUSCH repetition 625 may be part of a second set, with the first set configured for transmission to the TRP 630 and the second set configured for transmission to the TRP 635.

The first set and the second set may be configured based at least in part on the first set being associated with a first resource set (e.g., SRS resource set) and the second set being associated with a second resource set. The DCI may indicate a first set of transmission parameters for the first set of repetitions and may indicates a second set of transmission parameters for the second set of repetitions based at least in part on associations with a first SRS resource indicator (SRI) and a second SRS resource indicator. In some examples, the first SRI is associated with a first previously transmitted SRS that the UE transmitted on a first transmission beam and a second previously transmitted SRS that the UE transmitted on a second transmission beam.

The PUSCH may be codebook (CB)-based PUSCH or non-CB (NCB) PUSCH. For CB-based PUSCH, the DCI may also indicate transmission precoding matrix index (TPMI) fields to indicate two precoders for the two sets of repetitions.

For CB-based transmissions, the UE may be configured with only one SRS resource set with "usage" set to "codebook." A maximum of 4 SRS resources within the set may be configured for the UE. The SRI field in the uplink DCI (e.g., scheduling PUSCH) indicates one SRS resource. A number of layers (rank) and TPMI (precoder) for the scheduled PUSCH may be determined from a separate DCI field (e.g., "Precoding information and number of layers")

For NCB-based transmissions, UE can be configured with only one SRS resource set with "usage" set to "noncodebook". A maximum of 4 SRS resources within the set can be configured for the UE. Each SRS resource has one port. The SRI field in the uplink DCI (scheduling PUSCH) indicates one or multiple SRS resources. A number of indicated SRS resources determines a rank (e.g., number of layers) for the scheduled PUSCH. The PUSCH is transmitted with a same precoder as the indicated SRS resources (e.g., precoded by the UE).

As indicated above, FIG. 6 is provided as an example. Other examples may differ from what is described with respect to FIG. 6.

Figure 7:
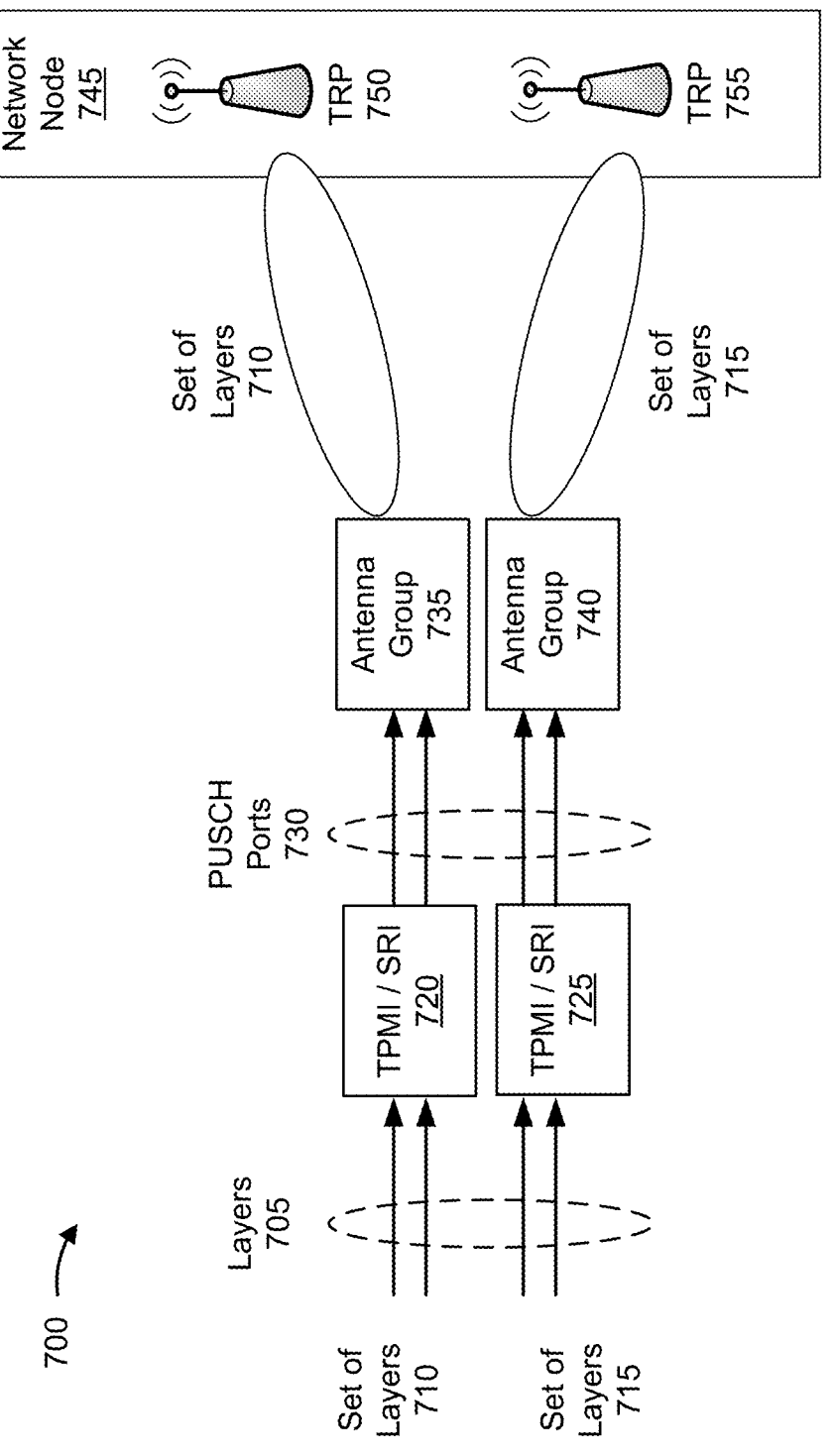
FIG. 7 is a diagram illustrating an example of multi-TRP communication, in accordance with the present disclosure.

FIG. 7 is a diagram illustrating an example 700 of multi-TRP communication, in accordance with the present disclosure. In context of FIG. 7, a UE may communicate with multiple TRPs of a network node.

In example 700, the UE may be scheduled to transmit layers 705 of a communication (e.g., a PUSCH communication or "PUSCH") to multiple TRPs. The layers 705 may include a first set of layers 710 and a second set of layers 715. The first set of layers 710 may be configured based at least in part on a TPMI and/or SRI 720 (e.g., based at least in part on association with a first SRS resource set indicator field), and the second set of layers 715 may be configured based at least in part on a TPMI and/or SRI 725 (e.g., based at least in part on association with a second SRS resource set indicator field). The first set of layers 710 may include, for example, layer 0 and layer 1 of the communication and the second set of layers may include layer 2 and layer 3 of the communication.

The UE may receive a single DCI that schedules a PUSCH that includes the layers 705. The DCI may indicate a first set of DMRS ports for the set of layers 710 and a second set of DMRS ports for the set of layers 715, and/or may indicate a first set of transmission parameters (e.g., associated with the TPMI and/or SRI 720) for the first set of layers 710 and a second set of transmission parameters (e.g., associated with the TPMI and/or SRI 725) for the second set of layers 715.

The sets of layers 710 and 715 may be output via a set of PUSCH ports 730 before being provided to antenna groups (antenna panels). For example, the set of layers 710 may be provided to an antenna group 735 and the set of layers 715 may be provided to an antenna group 740. The antenna groups 735 and 740 may be on the same or different antenna panels of the UE and/or may include one or more virtual antenna ports.

The antenna group 735 may transmit the set of layers 710 to a network node 745 via a first beam that is directed to a TRP 750 and may transmit the set of layers 715 to the network node 745 via a second beam that is directed to a TRP 755. The first beam and the second beam may be associated with the TPMI and/or SRI 720 and 725, respectively.

The UE may transmit the set of layers 710 and 715 using spatial division multiplexing, which may allow transmissions of the set of layers 710 and 715 to be transmitted with timing that overlaps (e.g., partially or fully).

As indicated above, FIG. 7 is provided as an example. Other examples may differ from what is described with respect to FIG. 7.

Figure 8:
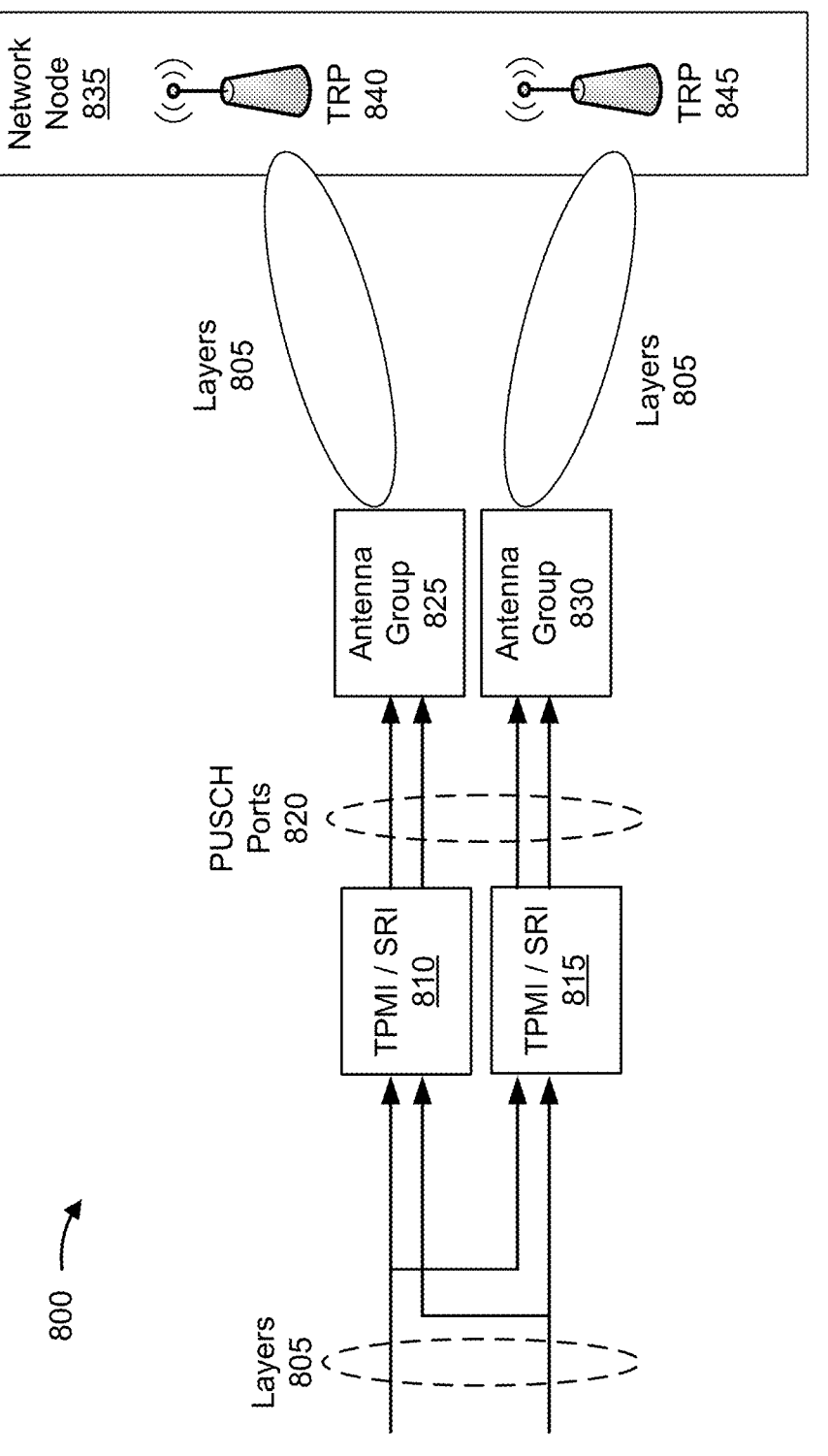
FIG. 8 is a diagram illustrating an example of multi-TRP communication, in accordance with the present disclosure.

FIG. 8 is a diagram illustrating an example 800 of multi-TRP communication, in accordance with the present disclosure. In context of FIG. 8, a UE may communicate with multiple TRPs of a network node. The multiple TRPs of the network node may be configured for communications as a single-frequency network (SFN). For example, the UE may receive a single DCI that schedules a PUSCH with multiple layers, where each DMRS port and/or layer of the PUSCH is transmitted from two panels with different transmission beams, precoders, and/or power control parameters (e.g., collectively, transmission parameters). The DCI may indicate two sets of one or more layers that are to be transmitted via each beam such that each TRP receives a repetition of all layers of the PUSCH. The DCI may include an indication of an SRS resource set indicator field, two SRI fields, and two TPMI fields associated with the two beams.

As shown in FIG. 8, the UE may be scheduled to transmit layers 805 of a communication (e.g., a PUSCH) to multiple TRPs. The layers 805 may be configured based at least in part on a TPMI and/or SRI 810 (e.g., based at least in part on association with a first SRS resource set indicator field) and configured based at least in part on a TPMI and/or SRI 815 (e.g., based at least in part on association with a second SRS resource set indicator field). The layers 805 may include, for example, layer 0 and layer 1 of the communication.

The layers 805, after being configured based at least in part on the TPMI and/or SRI 810 and the TPMI and/or SRI 815, may be output via a set of PUSCH ports 820 before being provided to antenna groups (antenna panels). For example, the layers 805 may be provided to an antenna group 825 and to an antenna group 830. The antenna groups 825 and 830 may be on the same or different antenna panels of the UE and/or may include one or more virtual antenna ports.

The antenna group 825 may transmit the layers 805 to a network node 835 via a first beam that is directed to a TRP 840 and may transmit the layers 805 to the network node 835 via a second beam that is directed to a TRP 845. The first beam and the second beam may be associated with the TPMI and/or SRI 810 and 815, respectively. The UE may transmit the layers 805 using spatial division multiplexing, which may allow transmissions of the set of layers 805 to be transmitted with timing that overlaps (e.g., partially or fully) in a way that provides spatial diversity for improved reception by the network node 835.

As indicated above, FIG. 8 is provided as an example. Other examples may differ from what is described with respect to FIG. 8.

Figure 9:
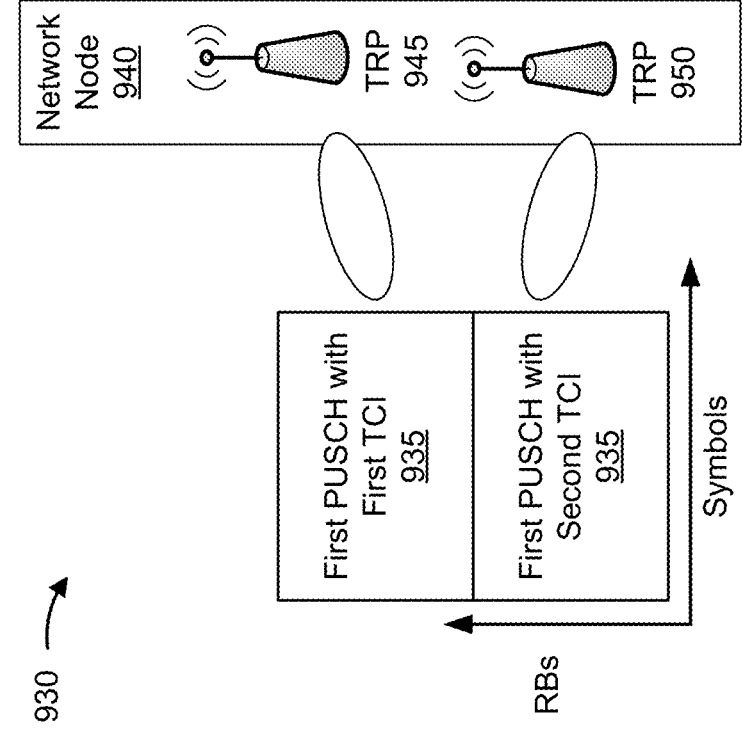
FIG. 9 is a diagram illustrating examples of multi-TRP communication, in accordance with the present disclosure.
Figure 9:
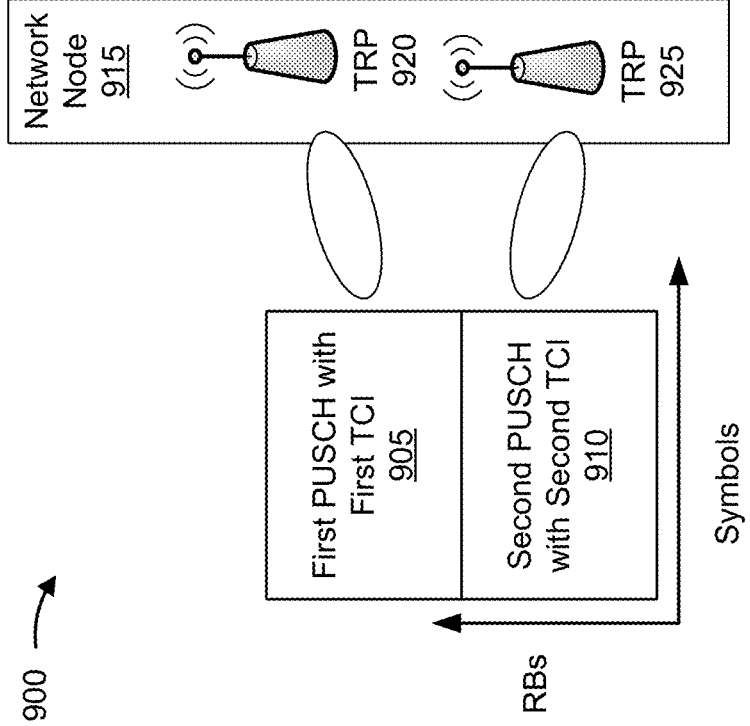

FIG. 9 is a diagram illustrating examples 900 and 930 of multi-TRP communication, in accordance with the present disclosure. In context of FIG. 9, a UE may communicate with multiple TRPs of a network node. In the examples 900 and 930, the UE may be scheduled via a single DCI that schedules a PUSCH with two sets of resource blocks (RBs) to be transmitted via two antenna groups with different transmission parameters. The two sets of RBs may be associated with two SRS resource sets. The DCI may include an SRS resource set indicator field, two SRI fields, and/or two TPMI fields.

As shown in example 900, the UE may transmit a first PUSCH 905 with a first TCI (e.g., beam or spatial relation) via a first set of RBs and a second PUSCH 910 with a second TCI via a second set of RBs that overlap in time (e.g., use at least one common symbol) with the first PUSCH 905.

The UE may transmit the first PUSCH 905 using a first set of transmission parameters (e.g., via a first beam) to a network node 915 via a TRP 920 and may transmit the second PUSCH 910 using a second set of transmission parameters (e.g., via a second beam) to the network node 915 via a TRP 925. In this case, a single redundancy version (RV) is mapped to the RBs of the first PUSCH 905 and the second PUSCH 910. This means that the first PUSCH and the second PUSCH may have different data.

As shown in example 930, the UE may transmit a first PUSCH 935 with a first TCI via a first set of RBs with a second TCI via a second set of RBs that overlap in time (e.g., use at least one common symbol). In this case the UE transmits the same data via both TCIs, spatial relations, and/or beams.

The UE may transmit the first PUSCH 935 using a first set of transmission parameters (e.g., via a first beam) to a network node 940 via a TRP 945 and may also transmit the first PUSCH 935 using a second set of transmission parameters (e.g., via a second beam) to the network node 940 via a TRP 950. In this case, a two RVs are mapped to the RBs of the first PUSCH 935 transmitted via the first beam and transmitted via the second beam.

As indicated above, FIG. 9 is provided as an example. Other examples may differ from what is described with respect to FIG. 9.

In some examples, a UE may transmit two PUSCHs that overlap in a time domain. In a frequency domain, the two PUSCHs may overlap (e.g., using spatial division multiplexing (SDM)) or may not overlap (e.g., using frequency division multiplexing (FDM) or SDM). This may be enabled using a multi-DCI-based multi-TRP framework, where the two PUSCHs are associated with different control resource set (CORESET) pool index values (e.g., coresetPoolIndex values).

This is different than SDM or FDM PUSCHs with a single-DCI-based framework, where simultaneous transmission or within one PUSCH. A first PUSCH (e.g., associated with coresetPoolIndex value 0) is associated with the first SRS resource set and is transmitted using a first set of transmission parameters (e.g., a first beam, TCI state, set of power control params, and/or precoder). A second PUSCH (associated with coresetPoolIndex value 1) is associated with a second SRS resource set and is transmitted using a second set of transmission parameters (e.g., a second TCI state, set of power control params, and/or precoder).

In some networks, antenna port numbers for SRSs and PUSCHs may be configured to start with 1000. For example, a first antenna port number may be 1000, a second may be 1001, and a third may be 1002. For repetitions applied to a physical channel (e.g., PUSCH), UE transmissions may be such that a channel over which a symbol on an antenna port is used for uplink transmission is conveyed may be inferred from a channel over which another symbol on the same antenna port is conveyed. This in inference may depend on whether the symbols correspond to a same repetition of a PUSCH transmission with repetition Type B, if the two symbols correspond to a same slot, or if the two symbols correspond to the same frequency hop.

For PUSCH and SRS port numbering (e.g., starting from 1000), in the case of NCB-based PUSCH, the UE may be configured to transmit PUSCH using one or more same antenna ports as one or more SRS ports in one or more SRS resources indicated by one or more SRIs given by a DCI (e.g., a scheduling DCI) or a configured grant configuration. The SRS port in (i+1)th SRS resource in the SRS resource set is indexed as 1000+i. The UE may also be configured with only one SRS resource set with usage "noncodebook."

In a case of TDM-based PUSCH, even though two SRS resource sets may be configured with usage "noncodebook," the port numbering rule may be acceptable if PUSCH transmissions (e.g., repetitions) associated with different SRS resource sets were non-overlapping in time (e.g., in different slots or different actual repetitions). However, in some networks, simultaneous transmission may be supported. In this case, the rule for PUSCH and SRS port numbering may not be acceptable. For example, in cases of single-DCI-based SDM schemes, single-DCI-based SFN schemes, multi-DCI-based PUSCH+PUSCH when the two PUSCHs associated with different coresetPoolIndexes and/or SRS resource sets are overlapping in both time and frequency. Similarly, the rule may be unacceptable for single-DCI-based FDM schemes with two non-overlapping RB sets associated with the two SRS resource sets, or a multi-DCI based PUSCH+PUSCH when the two PUSCHs are associated with different coresetPoolIndexes and/or SRS resource sets are overlapping in time but not in frequency.

In these cases, among other examples, a UE and/or a network node may incorrectly infer channel coherence across UE transmissions using a same port number, but with different transmission parameters. In this way, the network node may incorrectly apply a channel estimate from a first transmission to a second transmission when the first transmission and second transmission are received via different transmission paths (e.g., via different beams). This may cause decoding errors, which may consume computing, power, communication, and/or network resources to detect and correct.

In some aspects described herein, a UE may receive an indication of a mapping of port numbers to SRI resources of a first resource set and a second resource set, wherein port numbers of the first resource set and port numbers of the second resource set are uniquely indicated. For example, port numbers of the first resource set may be unique from (e.g., mutually exclusive from) port numbers of the second resource set. Alternatively, port numbers of the first resource set may be uniquely indicated from port numbers of the second resource set based at least in part on an indication that the port numbers of the first resource set are associated with the first resource set and/or an indication that the port numbers of the second resource set are associated with the second resource set. For example, antenna ports may be indicated with a pair of antenna port number and resource set index (e.g., SRS resource indicator).

This may be applied to NCB simultaneous PUSCH transmissions associated with two SRS resource sets, two beams, two TCI states, and/or two UE antenna panels, the UE may determine PUSCH antenna port numbers based at least in part on indices of one or more SRS resources in a first SRS resource set associated with a first PUSCH transmission and/or indices of one or more SRS resources in a second SRS resource set associated with a second PUSCH transmission.

In some aspects, PUSCH and/or SRS port numbering is sequential. For example, the port numbering may count (e.g., by ones or twos, for example) first across the first SRS resource set, and next across the second SRS resource set. A starting index for port numbers for the second SRS resource set depends on a number of SRS resources in the first SRS resource set. In some aspects, a fixed offset (e.g., 500 or 100, which may be fixed in a communication protocol and/or may be RRC configured) may be added to the PUSCH and/or SRS port numbers associated with the second SRS resource set. In either of these examples, port numbers may be unique across both SRS resource sets.

In some aspects, the port numbers of the first resource set and port numbers of the second resource set may be uniquely indicated (e.g., may be configured and/or required to be uniquely indicated) based at least in part on a configuration of communications. For example, in cases such as single-DCI-based SDM schemes where two PUSCH transmissions correspond to two sets of layers transmitted with different beams, single-DCI based SFN schemes where two PUSCH transmissions in the main proposal correspond to the same set of layers transmitted with different beams, SFN schemes where a number of PUSCH ports is the same across two transmissions (e.g., both have one port or both have two ports) in NCB PUSCHs, and/or multi-DCI based PUSCH+PUSCH schemes where the two PUSCH transmissions are two different PUSCHs associated with different coreset-PoolIndex values that are overlapping (e.g., at least partially) in both time and frequency. Additionally, or alternatively, the port numbers of the first resource set and port numbers of the second resource set may be uniquely indicated in cases, such as single-DCI-based FDM schemes where the two PUSCH transmissions correspond to two non-overlapping RB sets transmitted with different beams, or multi-DCI based PUSCH+PUSCH schemes where the two PUSCH transmissions are two different PUSCHs associated with different coresetPoolIndex values that are overlapping (e.g., at least partially) in time but non-overlapping in frequency.

In some aspects, the rule described for inferring a channel (e.g., the UE transmission shall be such that the channel over which a symbol on the antenna port used for uplink transmission is conveyed can be inferred from the channel over which another symbol on the same antenna port is conveyed) be dependent on "only if the transmissions are associated with the same SRS resource set, using a same uplink beam and/or a same TCI state." This dependency may be used in cases, such as CB-based PUSCHs in an SDM, SFN, or FDM scheme, CB-based PUSCH+PUSCH schemes with the two PUSCHs associated with different coreset-PoolIndex values, NCB-based PUSCHs for FDM schemes for two RB sets, NCB-based PUSCH schemes for PUSCH+ PUSCH associated with different coresetPoolIndex values overlapping in time but non-overlapping in frequency, among other examples. In some aspects, the dependency may not be required if the PUSCHs are identified by unique antenna ports, which may be used for NCB-based PUSCHs.

Based at least in part on the UE and network node uniquely indicating port numbers for an uplink communication (e.g., uplink transmission and/or PUSCH), the UE and/or the network node may correctly infer channel coherence across UE transmissions using a same port number. In this way, the network node may correctly apply a channel estimate from a first transmission to a second transmission when the first transmission and second transmission are received via a same transmission path (e.g., via a same beam). This may avoid decoding errors, which may conserve computing, power, communication, and/or network resources that may have otherwise been consumed to detect and correct the decoding errors.

Figure 10:
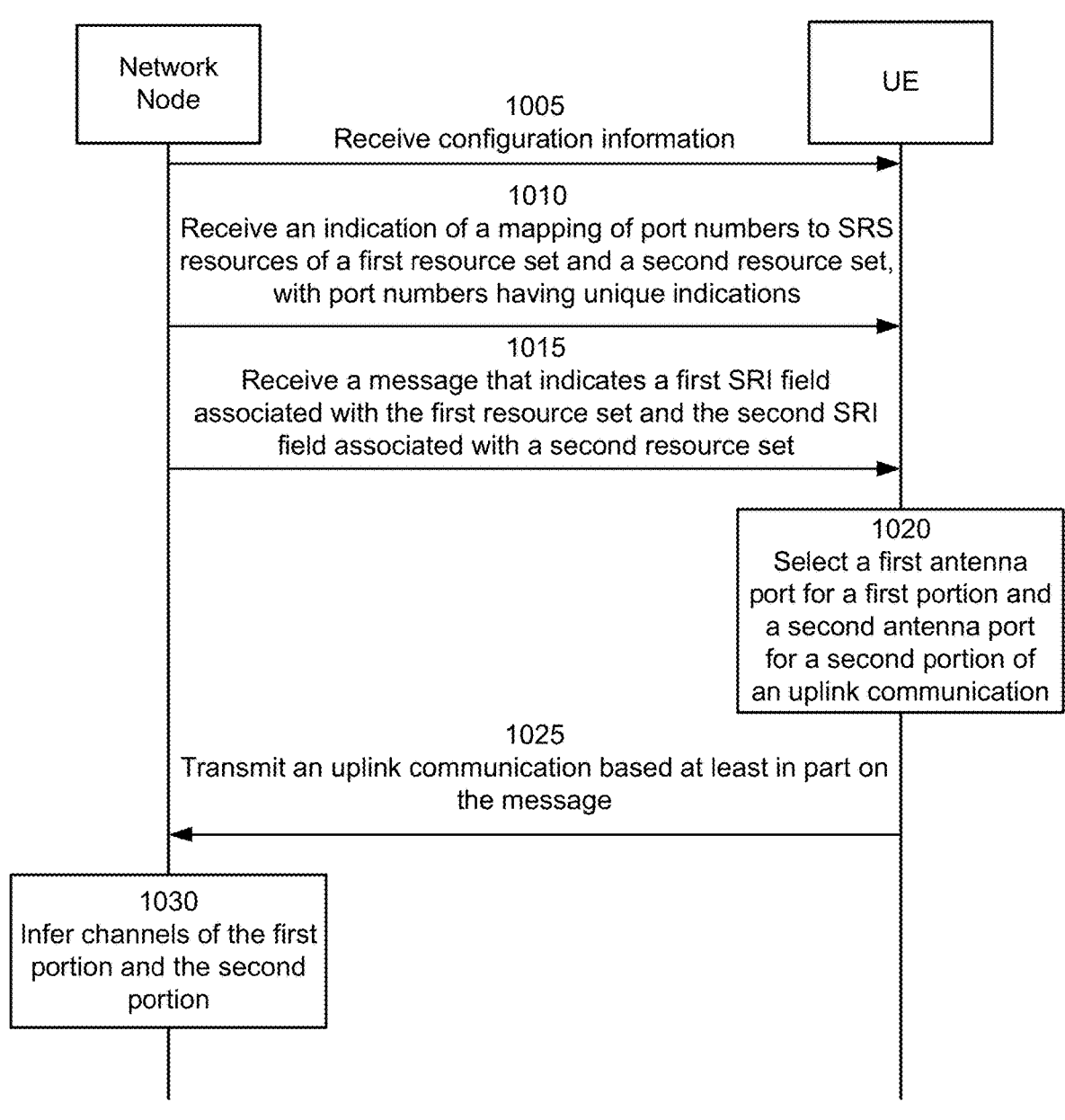
FIG. 10 is a diagram of an example associated with port number and resource set mapping, in accordance with the present disclosure.

FIG. 10 is a diagram of an example 1000 associated with port number and resource set mapping, in accordance with the present disclosure. As shown in FIG. 10, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 10. In some aspects, the UE may be configured to transmit uplink communications (e.g., PUSCHs) using CB-based transmissions and/or NCB-based transmissions.

As shown by reference number 1005, the network node may transmit, and the UE may receive, configuration information. In some aspects, the UE may receive the configuration information via one or more of RRC signaling, one or more MAC control elements, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate a configurations for uniquely indicating port numbers (e.g., associated with SRS resources and/or a PUSCH) for uplink communications (e.g., PUSCHs). For example, the configuration information may indicate that port numbers associated with a first resource set are offset from, or interleaved with, port numbers associated with a second resource set. In some aspects, the configuration information may indicate that port number indications are to include a pair of an antenna port number and an associated resource set index (e.g., SRS resource set index).

In some aspects, the configuration information may indicate that the port numbers associated with the first resource set are to be uniquely indicated from the port numbers associated with the second resource set based at least in part on one or more communication configurations. For example, based at least in part on the UE being configured for single-DCI-based SDM communications, single-DCI-based SFN communications, single-DCI-based FDM communications, and/or multi-DCI-based multiple PUSCH communications, with two PUSCH communications, that are associated with different CORESET pool indexes or SRS resource sets, that are at least partially overlapping in time and frequency.

The UE may configure itself based at least in part on the configuration information. In some aspects, the UE may be configured to perform one or more operations described herein based at least in part on the configuration information.

As shown by reference number 1010, the UE may receive, and the network node may transmit, an indication of a mapping of port numbers to SRS resources of a first resource set and a second resource set, with port numbers having unique indications. For example, the UE may receive an indication of a mapping of port numbers to SRS resources of a first resource set and a second resource set, with port numbers of the first resource set and port numbers of the second resource set being uniquely indicated.

In some aspects, the first resource set is associated with a first beam, a first TCI state, and/or a first UE antenna group (e.g., a first antenna panel). In some aspects, the second resource set is associated with a second beam, a second TCI state, and/or a second UE antenna group (e.g., a second antenna panel).

In some aspects, the port numbers of the first resource set and the port numbers of the second resource set may be sequential with a lowest number of the port numbers of the second resource set being higher than a highest number of the port numbers of the first resource set. In some aspects, the port numbers of the second resource set may be offset from the port numbers of the first resource set by an offset amount (e.g., 50 or 100, among other examples), with the lowest number of the port numbers of the second resource set being higher than the highest number of the port numbers of the first resource set. The offset amount may be configured via an indication from the network node and/or another network node. Additionally, or alternatively, the offset amount may be indicated in a communication protocol. In some aspects, the port numbers of the first resource set may be interleaved with the portion numbers of the second resource set. For example, the port numbers of the first resource set may be odd numbers and the port numbers of the second resource set may be even numbers.

Additionally, or alternatively, the port numbers associated with the first resource set may be uniquely indicated from the port numbers associated with the second resource set based at least in part on the port numbers of the first resource set being indicated with both of a first antenna port number and a first SRS resource set index associated with the first resource set and the port numbers of the second resource set being indicated with both of a second antenna port number and a second SRS resource set index associated with the second resource set.

As shown by reference number 1015, the UE may receive, and the network node may transmit, a message that indicates a first SRI field associated with the first resource set and a second SRI field associated with the second resource set. In some aspects, the message may include DCI, such as a scheduling DCI associated with one or more uplink communications.

As shown by reference number 1020, the UE may select a first antenna port for a first portion and as second antenna port for a second portion of an uplink communication.

As shown by reference number 1025, the UE may transmit, and the network node may receive, an uplink communication based at least in part on the message. For example, the UE may use the first antenna port and the second antenna port based at least in part on the message. The UE may transmit a first portion of the uplink communication via a first antenna port based at least in part on the first indication of the first SRI field associated with the first SRS resource set and may transmit a second portion of the uplink communication (e.g., a repetition of the first portion or a different payload from the first portion) via a second antenna port based at least in part on the second indication of the second SRI field associated with the second SRS resource set. The UE may transmit the first portion and the second portion using resources that overlap in time and/or frequency.

As shown by reference number 1030, the network node may infer channels of the first portion and the second portion. In some aspects, the network node may infer that a same channel is used for multiple repetitions if the multiple repetitions are associated with a same, uniquely identified port number. For example, the network node may infer a channel, over which a symbol on an antenna port used for uplink transmission is conveyed, from a channel over which another symbol on a same antenna port is conveyed. The network node may infer the channel based at least in part on the uplink transmission being associated with a same SRS resource set, a same uplink beam, or a same TCI state.

In some aspects, the network node may be configured to infer the channel based at least in part on the network node being configured to communicate with the UE using CB-based PUSCH communications in an SDM, an SFN, or an FDM configuration. In some aspects, the network node may be configured to infer the channel based at least in part on the network node being configured to communicate with the UE using CB-based multiple PUSCH communications associated with different CORESET pool index values, using NCB-based PUSCH communications for an FDM config-ured for two resource block sets, and/or using NCB-based PUSCH communications for multiple PUSCH communica-tions associated with different CORESET pool index values with the multiple communications overlapping in time.

Based at least in part on the UE and network node uniquely indicating port numbers for an uplink communi-cation (e.g., uplink transmission and/or PUSCH), the UE and/or the network node may correctly infer channel coher-ence across UE transmissions using a same port number. In this way, the network node may correctly apply a channel estimate from a first transmission to a second transmission when the first transmission and second transmission are received via a same transmission path (e.g., via a same beam). This may avoid decoding errors, which may con-serve computing, power, communication, and/or network resources that may have otherwise been consumed to detect and correct the decoding errors.

As indicated above, FIG. 10 is provided as an example. Other examples may differ from what is described with respect to FIG. 10.

Figure 11:
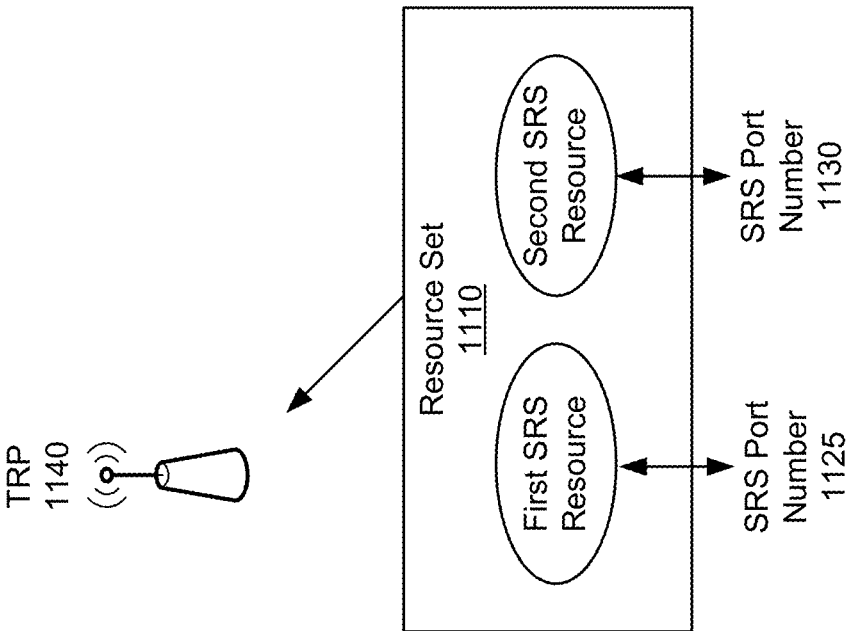
FIG. 11 is a diagram illustrating an example associated with port number and resource set mapping, in accordance with the present disclosure.
Figure 11:
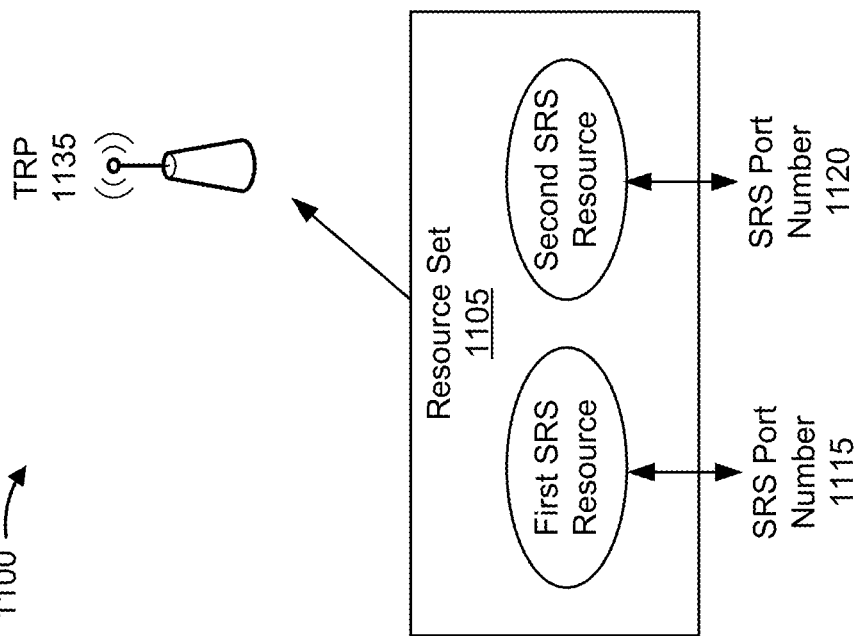

FIG. 11 is a diagram illustrating an example 1100 asso-ciated with port number and resource set mapping, in accordance with the present disclosure. In context of FIG. 11, a UE may communicate with multiple TRPs of a network node using uniquely identified SRS port numbers.

As shown in FIG. 11, the UE may be configured with a resource set 1105 (e.g., a first SRS resource set) and a resource set 1110 (e.g., a second SRS resource set). The resource set 1105 may be associated with a first SRS resource and a second SRS resource. The first SRS resource of the resource set 1105 may be indicated with an SRS port number 1115, and the second SRS resource of the resource set 1105 may be indicated with an SRS port number 1120. The first SRS resource of the resource set 1110 may be indicated with an SRS port number 1125, and the second SRS resource of the resource set 1110 may be indicated with an SRS port number 1130.

The UE may communicate with a network node via a TRP 1135 based at least in part on using transmission parameters associated with the SRS port number 1115 or the SRS port number 1120. The UE may communicate with the network node via a TRP 1140 based at least in part on using transmission parameters associated with the SRS port num-ber 1125 or the SRS port number 1130.

In some aspects, the SRS port numbers 1115-1130 may be uniquely identified. For example, unique indications may be associated with different SRS port numbers. In some aspects, the unique indication may include unique port numbers. For example, each of the SRS port numbers 1115-1130 may be different from the rest. In some aspects, the SRS port numbers 1115-1130 may be sequential across both resource sets 1105 and 1110. In some aspects, the SRS port numbers 1125 and 1130 may be offset (e.g., by an offset amount of 50, 100, 500, among other examples) from the SRS port numbers 1115 and 1120.

Additionally, or alternatively, the unique indications may be associated with a pair of indication information elements that include a first information element that indicates an SRS port number and a second information element that indicates an associated resource set. For example, the SRS port numbers may have a unique indication of (resource set 1105, SRS port number 1115), (resource set 1105, SRS port number 1120), (resource set 1110, SRS port number 1125), and (resource set 1110, SRS port number 1130). In this way, if SRS port number 1115 and SRS port number 1125 have matching port number identifiers (e.g., 1001), the SRS port number 1125 and the SRS port number 1115 are still uniquely identified based at least in part on the unique indication also indicating the different resource sets.

As indicated above, FIG. 11 is provided as an example. Other examples may differ from what is described with respect to FIG. 11.

Figure 12:
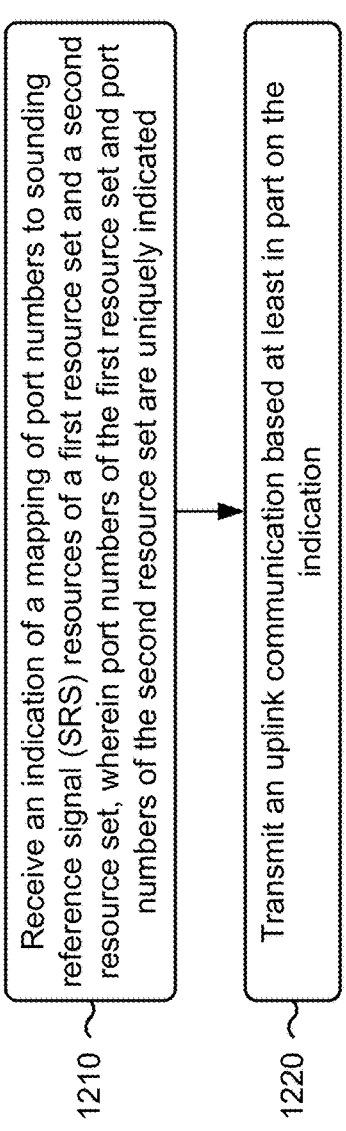
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with port number and resource set mapping.

As shown in FIG. 12, in some aspects, process 1200 may include receiving an indication of a mapping of port num-bers to SRS resources of a first resource set and a second resource set, wherein port numbers of the first resource set and port numbers of the second resource set are uniquely indicated (block 1210). For example, the UE (e.g., using communication manager 140 and/or reception component 1402, depicted in FIG. 14) may receive an indication of a mapping of port numbers to SRS resources of a first resource set and a second resource set, wherein port numbers of the first resource set and port numbers of the second resource set are uniquely indicated, as described above.

As further shown in FIG. 12, in some aspects, process 1200 may include transmitting an uplink communication based at least in part on the indication (block 1220). For example, the UE (e.g., using communication manager 140 and/or transmission component 1404, depicted in FIG. 14) may transmit an uplink communication based at least in part on the indication, as described above.

Process 1200 may include additional aspects, such as any single aspect or any combination of aspects described below and/or in connection with one or more other processes described elsewhere herein.

In a first aspect, process 1200 includes receiving a mes-sage that includes a first indication of a first SRI field associated with the first resource set and a second indication of a second SRI field associated with the second resource set.

In a second aspect, alone or in combination with the first aspect, the message comprises DCI that schedules the uplink communication.

In a third aspect, alone or in combination with one or more of the first and second aspects, the first resource set is associated with a first beam, a first TCI state, or a first UE antenna group, and wherein the second resource set is associated with a second beam, a second TCI state, or a second UE antenna group.

In a fourth aspect, alone or in combination with one or more of the first through third aspects, transmitting the uplink communication based at least in part on the indication comprises transmitting a first portion of the uplink communication via a first antenna port based at least in part on the first indication of the first SRI field associated with the first SRS resource set, and transmitting a second portion of the uplink communication via a second antenna port based at least in part on the second indication of the second SRI field associated with the second SRS resource set.

In a fifth aspect, alone or in combination with one or more of the first through fourth aspects, transmitting the first portion of the uplink communication and the second portion of the uplink communication comprises transmitting the first portion of the uplink communication and the second portion of the second portion of the uplink communication using resources that overlap in time.

In a sixth aspect, alone or in combination with one or more of the first through fifth aspects, the port numbers of the first resource set and the port numbers of the second resource set are sequential with a lowest number of the port numbers of the second resource set being higher than a highest number of the port numbers of the first resource set, wherein the port numbers of the second resource set are offset from the port numbers of the first resource set by an offset amount, with the lowest number of the port numbers of the second resource set being higher than the highest number of the port numbers of the first resource set, or wherein the port numbers of the first resource set are odd numbers and the port numbers of the second resource set are even numbers.

In a seventh aspect, alone or in combination with one or more of the first through sixth aspects, the port numbers of the first resource set and the port numbers of the second resource set are uniquely indicated based at least in part on the UE being configured for one or more of single-DCI-based spatial division multiplexing communications, single-DCI-based single frequency network communications, single-DCI-based frequency division multiplexing communications, multi-DCI-based multiple PUSCH communications, with two PUSCH communications, that are associated with different CORESET pool indexes or SRS resource sets, that are at least partially overlapping in time and frequency.

In an eighth aspect, alone or in combination with one or more of the first through seventh aspects, the port numbers of the first resource set and port numbers of the second resource set are uniquely indicated based at least in part on the port numbers of the first resource set being indicated with both of a first antenna port number and a first SRS resource set index associated with the first resource set, and the port numbers of the second resource set being indicated with both of a second antenna port number and a second SRS resource set index associated with the second resource set.

In a ninth aspect, alone or in combination with one or more of the first through eighth aspects, a channel over which a symbol on an antenna port used for uplink transmission is conveyed is inferable from a channel over which another symbol on a same antenna port is conveyed based at least in part on the uplink transmission being associated with a same SRS resource set, a same uplink beam, or a same TCI state.

In a tenth aspect, alone or in combination with one or more of the first through ninth aspects, the channel over which the symbol on the antenna port used for uplink transmission is conveyed is inferable from the channel over which another symbol on the same antenna port is conveyed based at least in part on the transmissions being associated with the same SRS resource set, the same uplink beam, or the same TCI state based at least in part on the UE being configured for one or more of CB-based PUSCH communications in a SDM, an SFN, or an FDM configuration, CB-based multiple PUSCH communications associated with different CORESET pool index values, NCB-based PUSCH communications for an FDM configured for two resource block sets, or NCB-based PUSCH communications for multiple PUSCH communications associated with different CORESET pool index values, the multiple communications overlapping in time.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
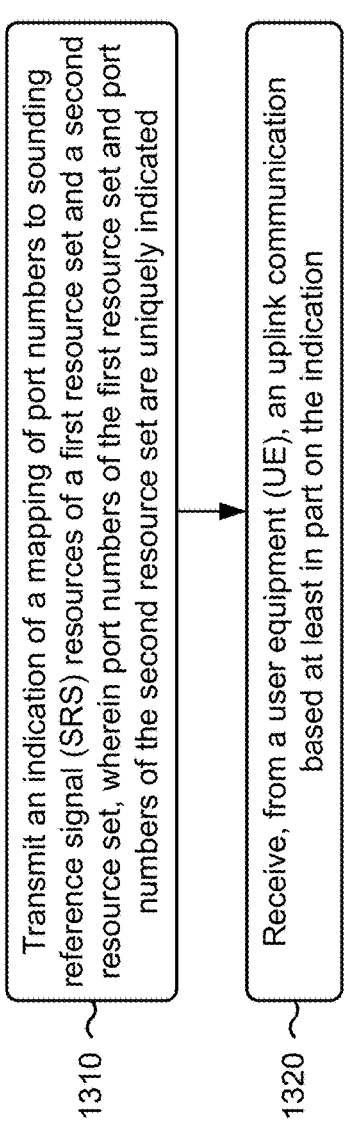
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with port number and resource set mapping.

As shown in FIG. 13, in some aspects, process 1300 may include transmitting an indication of a mapping of port numbers to SRS resources of a first resource set and a second resource set, wherein port numbers of the first resource set and port numbers of the second resource set are uniquely indicated (block 1310). For example, the network node (e.g., using communication manager 1508 and/or transmission component 1504, depicted in FIG. 15) may transmit an indication of a mapping of port numbers to SRS resources of a first resource set and a second resource set, wherein port numbers of the first resource set and port numbers of the second resource set are uniquely indicated, as described above.

As further shown in FIG. 13, in some aspects, process 1300 may include receiving, from a UE, an uplink communication based at least in part on the indication (block 1320). For example, the network node (e.g., using communication manager 1508 and/or reception component 1502, depicted in FIG. 15) may receive, from a UE, an uplink communication based at least in part on the indication, as described above.

Process 1300 may include additional aspects, such as any single aspect or any combination of aspects described below and/or in connection with one or more other processes described elsewhere herein.

In a first aspect, process 1300 includes transmitting a message that includes a first indication of a first SRI field associated with the first resource set and a second indication of a second SRI field associated with the second resource set.

In a second aspect, alone or in combination with the first aspect, the message comprises DCI that schedules the uplink communication.

In a third aspect, alone or in combination with one or more of the first and second aspects, the first resource set is associated with a first beam, a first TCI state, or a first UE antenna group, and wherein the second resource set is associated with a second beam, a second TCI state, or a second UE antenna group.

In a fourth aspect, alone or in combination with one or more of the first through third aspects, receiving the uplink communication based at least in part on the indication comprises receiving a first portion of the uplink communication via a first antenna port based at least in part on the first indication of the first SRI field associated with the first SRS resource set, and receiving a second portion of the uplink communication via a second antenna port based at least in part on the second indication of the second SRI field associated with the second SRS resource set.

In a fifth aspect, alone or in combination with one or more of the first through fourth aspects, receiving the first portion of the uplink communication and the second portion of the uplink communication comprises receiving the first portion of the uplink communication and the second portion of the second portion of the uplink communication using resources that overlap in time.

In a sixth aspect, alone or in combination with one or more of the first through fifth aspects, the port numbers of the first resource set and the port numbers of the second resource set are sequential with a lowest number of the port numbers of the second resource set being higher than a highest number of the port numbers of the first resource set, wherein the port numbers of the second resource set are offset from the port numbers of the first resource set by an offset amount, with the lowest number of the port numbers of the second resource set being higher than the highest number of the port numbers of the first resource set, or wherein the port numbers of the first resource set are odd numbers and the port numbers of the second resource set are even numbers.

In a seventh aspect, alone or in combination with one or more of the first through sixth aspects, the port numbers of the first resource set and the port numbers of the second resource set are uniquely indicated based at least in part on configuring the UE for one or more of single-DCI-based spatial division multiplexing communications, single-DCI-based single frequency network communications, single-DCI-based frequency division multiplexing communications, multi-DCI-based multiple PUSCH communications, with two PUSCH communications, that are associated with different CORESET pool indexes or SRS resource sets, that are at least partially overlapping in time and frequency.

In an eighth aspect, alone or in combination with one or more of the first through seventh aspects, the port numbers of the first resource set and port numbers of the second resource set are uniquely indicated based at least in part on the port numbers of the first resource set being indicated with both of a first antenna port number and a first SRS resource set index associated with the first resource set, and the port numbers of the second resource set being indicated with both of a second antenna port number and a second SRS resource set index associated with the second resource set.

In a ninth aspect, alone or in combination with one or more of the first through eighth aspects, a channel over which a symbol on an antenna port used for uplink transmission is conveyed is inferable from a channel over which another symbol on the same antenna port is conveyed based at least in part on the transmissions being associated with a same SRS resource set, a same uplink beam, or a same TCI state.

In a tenth aspect, alone or in combination with one or more of the first through ninth aspects, the channel over which the symbol on the antenna port used for uplink transmission is conveyed is inferable from the channel over which another symbol on the same antenna port is conveyed based at least in part on the transmissions being associated with the same SRS resource set, the same uplink beam, or the same TCI state based at least in part on the UE being configured for one or more of CB-based PUSCH communications in a SDM, a SFN, or a FDM configuration, CB-based multiple PUSCH communications associated with different CORESET pool index values, NCB-based PUSCH communications for an FDM configured for two resource block sets, or NCB-based PUSCH communications for multiple PUSCH communications associated with different CORESET pool index values, the multiple communications overlapping in time.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
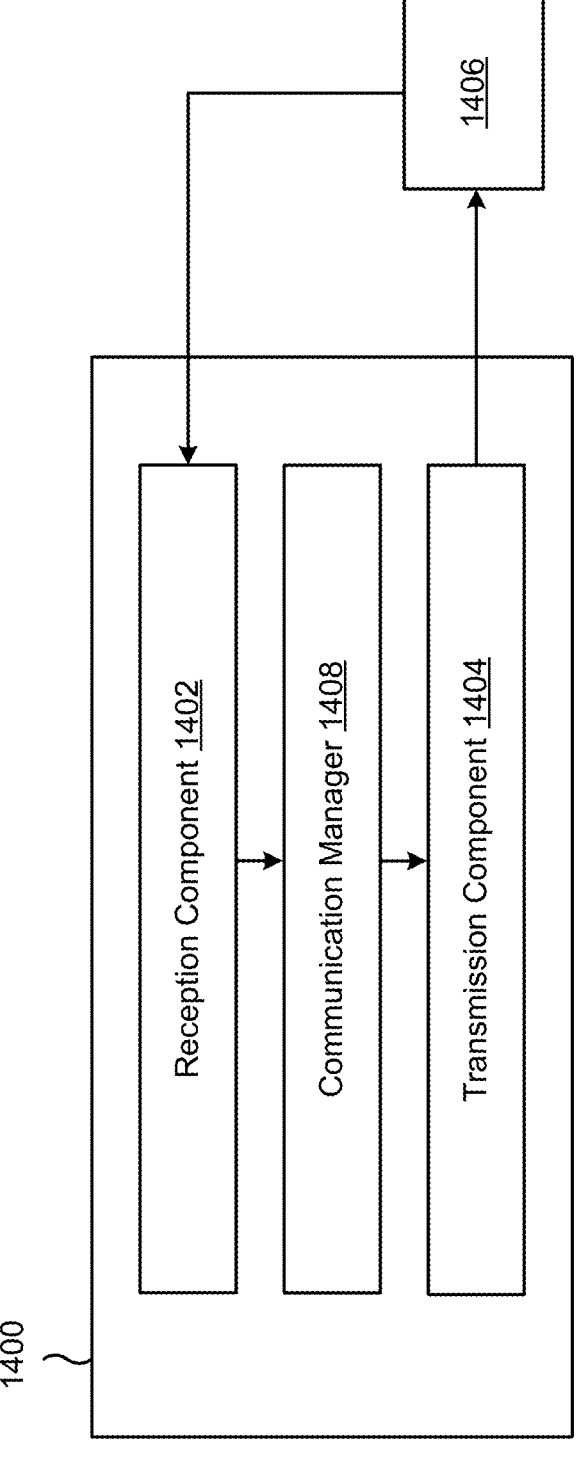
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408 (e.g., the communication manager 140).

In some aspects, the apparatus 1400 may be configured to perform one or more operations described herein in connection with FIGS. 10-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/ processor, a memory, or a combination thereof, of the UE described in connection with FIG. 2. In some aspects, the transmission component 1404 may be co-located with the reception component 1402 in a transceiver.

The reception component 1402 may receive an indication of a mapping of port numbers to SRS resources of a first resource set and a second resource set, wherein port numbers of the first resource set and port numbers of the second resource set are uniquely indicated. The transmission component 1404 may transmit an uplink communication based at least in part on the indication.

The reception component 1402 may receive a message that includes a first indication of a first SRI field associated with the first resource set and a second indication of a second SRI field associated with the second resource set.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
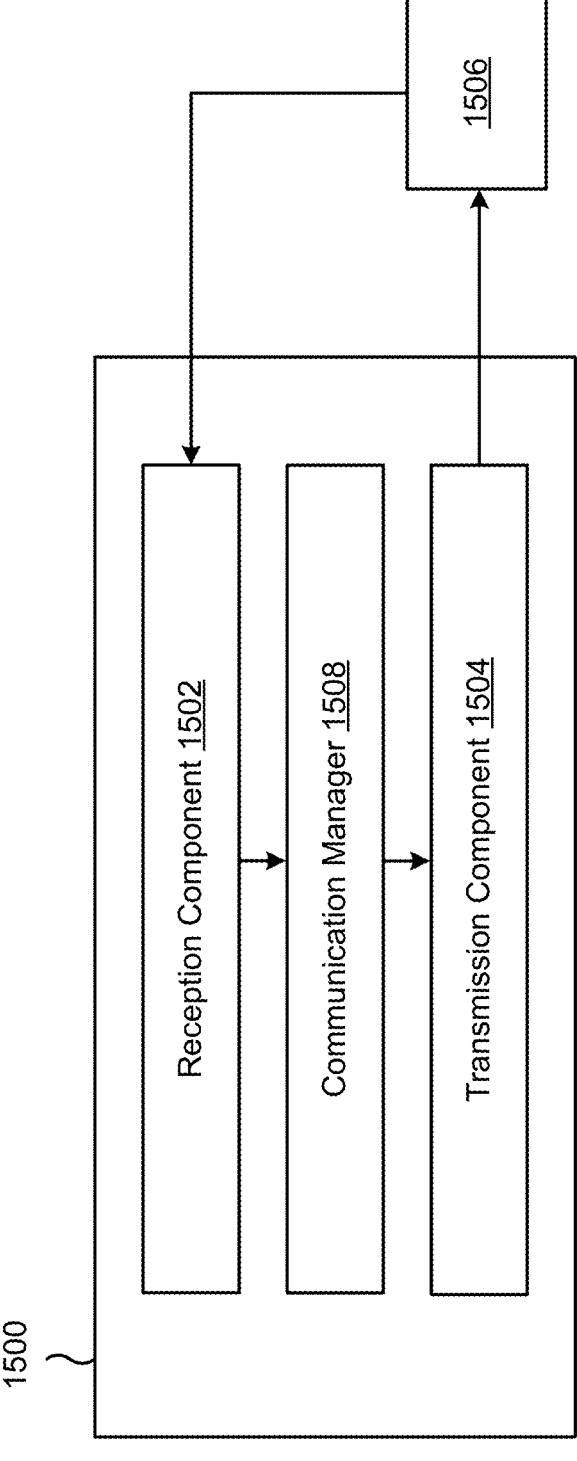
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a communication manager 1508 (e.g., the communication manager 150).

In some aspects, the apparatus 1500 may be configured to perform one or more operations described herein in connection with FIGS. 10-11. Additionally, or alternatively, the apparatus 1500 may be configured to perform one or more processes described herein, such as process 1300 of FIG. 13.

In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/ processor, a memory, or a combination thereof, of the network node described in connection with FIG. 2. In some aspects, the transmission component 1504 may be co-located with the reception component 1502 in a transceiver.

The transmission component 1504 may transmit an indication of a mapping of port numbers to SRS resources of a first resource set and a second resource set, wherein port numbers of the first resource set and port numbers of the second resource set are uniquely indicated. The reception component 1502 may receive, from a UE, an uplink communication based at least in part on the indication.

The transmission component 1504 may transmit a message that includes a first indication of a first SRI field associated with the first resource set and a second indication of a second SRI field associated with the second resource set.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Addition- ally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication per- formed by a user equipment (UE), comprising: receiving an indication of a mapping of port numbers to sounding refer- ence signal (SRS) resources of a first resource set and a second resource set, wherein port numbers of the first resource set and port numbers of the second resource set are uniquely indicated; and transmitting an uplink communica- tion based at least in part on the indication.

Aspect 2: The method of Aspect 1, further comprising: receiving a message that includes a first indication of a first SRS resource indicator (SRI) field associated with the first resource set and a second indication of a second SRI field associated with the second resource set.

Aspect 3: The method of Aspect 2, wherein the message comprises: downlink control information (DCI) that sched- ules the uplink communication.

Aspect 4: The method of any of Aspects 1-3, wherein the first resource set is associated with a first beam, a first transmission configuration indicator (TCI) state, or a first UE antenna group, and wherein the second resource set is associated with a second beam, a second TCI state, or a second UE antenna group.

Aspect 5: The method of any of Aspects 1-4, wherein transmitting the uplink communication based at least in part on the indication comprises: transmitting a first portion of the uplink communication via a first antenna port based at least in part on the first indication of the first SRI field associated with the first SRS resource set; and transmitting a second portion of the uplink communication via a second antenna port based at least in part on the second indication of the second SRI field associated with the second SRS resource set.

Aspect 6: The method of Aspect 5, wherein transmitting the first portion of the uplink communication and the second portion of the uplink communication comprises: transmit- ting the first portion of the uplink communication and the second portion of the second portion of the uplink commu- nication using resources that overlap in time.

Aspect 7: The method of any of Aspects 1-6, wherein the port numbers of the first resource set and the port numbers of the second resource set are sequential with a lowest number of the port numbers of the second resource set being higher than a highest number of the port numbers of the first resource set, wherein the port numbers of the second resource set are offset from the port numbers of the first resource set by an offset amount, with the lowest number of the port numbers of the second resource set being higher than the highest number of the port numbers of the first resource set, or wherein the port numbers of the first resource set are odd numbers and the port numbers of the second resource set are even numbers.

Aspect 8: The method of any of Aspects 1-7, wherein the port numbers of the first resource set and the port numbers of the second resource set are uniquely indicated based at least in part on the UE being configured for one or more of: single-downlink control information (DCI)-based spatial division multiplexing communications, single-DCI-based single frequency network communications, single-DCI- based frequency division multiplexing communications, multi-DCI-based multiple physical uplink shared channel) communications, with two PUSCH communications, that are associated with different control resource set (CORE- SET) pool indexes or SRS resource sets, that are at least partially overlapping in time and frequency.

Aspect 9: The method of any of Aspects 1-8, wherein the port numbers of the first resource set and port numbers of the second resource set are uniquely indicated based at least in part on: the port numbers of the first resource set being indicated with both of a first antenna port number and a first SRS resource set index associated with the first resource set, and the port numbers of the second resource set being indicated with both of a second antenna port number and a second SRS resource set index associated with the second resource set.

Aspect 10: The method of any of Aspects 1-9, wherein a channel over which a symbol on an antenna port used for uplink transmission is conveyed is inferable from a channel over which another symbol on a same antenna port is conveyed based at least in part on the uplink transmission being associated with a same SRS resource set, a same uplink beam, or a same transmission configuration indicator (TCI) state.

Aspect 11: The method of Aspect 10, wherein the channel over which the symbol on the antenna port used for uplink transmission is conveyed is inferable from the channel over which another symbol on the same antenna port is conveyed based at least in part on the transmissions being associated with the same SRS resource set, the same uplink beam, or the same transmission configuration indicator (TCI) state based at least in part on the UE being configured for one or more of: codebook (CB)-based physical uplink shared chan- nel (PUSCH) communications in a spatial division multi- plexing (SDM), a single frequency network (SFN), or a frequency division multiplexing (FDM) configuration, CB- based multiple PUSCH communications associated with different control resource set (CORESET) pool index val- ues, non-CB (NCB)-based PUSCH communications for an FDM configured for two resource block sets, or NCB-based PUSCH communications for multiple PUSCH communica- tions associated with different CORESET pool index values, the multiple communications overlapping in time.

Aspect 12: A method of wireless communication per- formed by a network node, comprising: transmitting an indication of a mapping of port numbers to sounding refer- ence signal (SRS) resources of a first resource set and a second resource set, wherein port numbers of the first resource set and port numbers of the second resource set are uniquely indicated; and receiving, from a user equipment (UE), an uplink communication based at least in part on the indication.

Aspect 13: The method of Aspect 12, further comprising: transmitting a message that includes a first indication of a first SRS resource indicator (SRI) field associated with the first resource set and a second indication of a second SRI field associated with the second resource set.

Aspect 14: The method of Aspect 13, wherein the mes- sage comprises: downlink control information (DCI) that schedules the uplink communication.

Aspect 15: The method of any of Aspects 12-14, wherein the first resource set is associated with a first beam, a first transmission configuration indicator (TCI) state, or a first UE antenna group, and wherein the second resource set is associated with a second beam, a second TCI state, or a second UE antenna group.

Aspect 16: The method of any of Aspects 12-15, wherein receiving the uplink communication based at least in part on the indication comprises: receiving a first portion of the uplink communication via a first antenna port based at least in part on the first indication of the first SRI field associated with the first SRS resource set; and receiving a second portion of the uplink communication via a second antenna port based at least in part on the second indication of the second SRI field associated with the second SRS resource set.

Aspect 17: The method of Aspect 16, wherein receiving the first portion of the uplink communication and the second portion of the uplink communication comprises: receiving the first portion of the uplink communication and the second portion of the second portion of the uplink communication using resources that overlap in time.

Aspect 18: The method of any of Aspects 12-17, wherein the port numbers of the first resource set and the port numbers of the second resource set are sequential with a lowest number of the port numbers of the second resource set being higher than a highest number of the port numbers of the first resource set, wherein the port numbers of the second resource set are offset from the port numbers of the first resource set by an offset amount, with the lowest number of the port numbers of the second resource set being higher than the highest number of the port numbers of the first resource set, or wherein the port numbers of the first resource set are odd numbers and the port numbers of the second resource set are even numbers.

Aspect 19: The method of any of Aspects 12-18, wherein the port numbers of the first resource set and the port numbers of the second resource set are uniquely indicated based at least in part on configuring the UE for one or more of: single-downlink control information (DCI)-based spatial division multiplexing communications, single-DCI-based single frequency network communications, single-DCI-based frequency division multiplexing communications, multi-DCI-based multiple physical uplink shared channel (PUSCH) communications, with two PUSCH communications, that are associated with different control resource set (CORESET) pool indexes or SRS resource sets, that are at least partially overlapping in time and frequency.

Aspect 20: The method of any of Aspects 12-19, wherein the port numbers of the first resource set and port numbers of the second resource set are uniquely indicated based at least in part on: the port numbers of the first resource set being indicated with both of a first antenna port number and a first SRS resource set index associated with the first resource set, and the port numbers of the second resource set being indicated with both of a second antenna port number and a second SRS resource set index associated with the second resource set.

Aspect 21: The method of any of Aspects 12-20, wherein a channel over which a symbol on an antenna port used for uplink transmission is conveyed is inferable from a channel over which another symbol on the same antenna port is conveyed based at least in part on the transmissions being associated with a same SRS resource set, a same uplink beam, or a same transmission configuration indicator (TCI) state.

Aspect 22: The method of Aspect 21, wherein the channel over which the symbol on the antenna port used for uplink transmission is conveyed is inferable from the channel over which another symbol on the same antenna port is conveyed based at least in part on the transmissions being associated with the same SRS resource set, the same uplink beam, or the same transmission configuration indicator (TCI) state based at least in part on the UE being configured for one or more of: codebook (CB)-based physical uplink shared channel (PUSCH) communications in a spatial division multiplexing (SDM), a single frequency network (SFN), or a frequency division multiplexing (FDM) configuration, CB-based multiple PUSCH communications associated with different control resource set (CORESET) pool index values, non-CB (NCB)-based PUSCH communications for an FDM configured for two resource block sets, or NCB-based PUSCH communications for multiple PUSCH communications associated with different CORESET pool index values, the multiple communications overlapping in time.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a first sounding reference signal (SRS) resource indicator (SRI) that includes:

a first mapping of first antenna port numbers to first SRS resources of a first SRS resource set, and an indication of a first set of layers associated with the first SRS resources; receive a second SRI that includes:

a second mapping of second antenna port numbers to second SRS resources of a second SRS resource set, wherein the first antenna port numbers of the first SRS resource set are mutually exclusive from the second antenna port numbers of the second SRS resource set, and an indication of a second set of layers associated with the second SRS resources; and transmit an uplink communication based at least in part on the first SRI or the second SRI.

2. The UE of claim 1, wherein, to receive the first SRI and the second SRI, the one or more processors are configured to:

receive a message that includes a first SRI field and a second SRI field, wherein the first SRI field includes the first SRI, and wherein the second SRI field includes the second SRI.

3. The UE of claim 2, wherein the message comprises:

downlink control information (DCI) that schedules the uplink communication.

4. The UE of claim 2, wherein the one or more processors, to transmit the uplink communication, are configured to:

transmit a first portion of the uplink communication via a first antenna port based at least in part on the first SRI; and transmit a second portion of the uplink communication via a second antenna port based at least in part on the second SRI.

5. The UE of claim 1, wherein the first SRS resource set is associated with a first beam, a first transmission configuration indicator (TCI) state, or a first UE antenna group, and wherein the second SRS resource set is associated with a second beam, a second TCI state, or a second UE antenna group.

6. The UE of claim 4, wherein the one or more processors, to transmit the first portion of the uplink communication and the second portion of the uplink communication, are configured to:

transmit the first portion of the uplink communication and the second portion of the uplink communication using resources that overlap in time.

7. The UE of claim 1, wherein the first antenna port numbers mapped to the first SRS resource set and the second antenna port numbers mapped to the second SRS resource set are indicated based at least in part on the UE being configured for one or more of:

single-downlink control information (DCI)-based spatial division multiplexing communications, single-DCI-based single frequency network communications, single-DCI-based frequency division multiplexing communications, or multi-DCI-based multiple physical uplink shared channel (PUSCH) communications, with two PUSCH communications, that are associated with different control resource set (CORESET) pool indexes or SRS resource sets, that are at least partially overlapping in time and frequency.

8. The UE of claim 1, wherein the first antenna port numbers mapped to the first SRS resource set and the second antenna port numbers mapped to the second SRS resource set are indicated based at least in part on:

the first antenna port numbers mapped to the first SRS resource set being indicated with both of a first antenna port number and a first SRS resource set index associated with the first SRS resource set, and the second antenna port numbers mapped to the second SRS resource set being indicated with both of a second antenna port number and a second SRS resource set index associated with the second SRS resource set.

9. The UE of claim 1,
wherein a channel over which a symbol on an antenna
port used for uplink transmission is conveyed is infer-
able from a channel over which another symbol on a
same antenna port is conveyed based at least in part on
uplink transmission being associated with a same SRS
resource set, a same uplink beam, or a same transmis-
sion configuration indicator (TCI) state.

10. The UE of claim 9,
wherein the channel over which the symbol on the
antenna port used for uplink transmission is conveyed
is inferable from the channel over which another sym-
bol on the same antenna port is conveyed based at least
in part on the transmissions being associated with the
same SRS resource set, the same uplink beam, or the
same transmission configuration indicator (TCI) state
based at least in part on the UE being configured for
one or more of:
    codebook (CB)-based physical uplink shared channel
        (PUSCH) communications in a spatial division mul-
        tiplexing (SDM), a single frequency network (SFN),
        or a frequency division multiplexing (FDM) con-
        figuration,
    CB-based multiple PUSCH communications associ-
        ated with different control resource set (CORESET)
        pool index values,
    non-CB (NCB)-based PUSCH communications for an
        FDM configured for two resource block sets, or
    NCB-based PUSCH communications for multiple
        PUSCH communications associated with different
        CORESET pool index values, the multiple PUSCH
        communications overlapping in time.

11. A network node for wireless communication, com-
prising:
    one or more memories; and
    one or more processors, coupled to the one or more
        memories, configured to:
        transmit a first sounding reference signal (SRS)
            resource indicator (SRI) that includes:
            a first mapping of first antenna port numbers to first
                SRS resources of a first SRS resource set, and
            an indication of a first set of layers associated with
                the first SRS resources; transmit a second SRI that
                includes:
            a second mapping of second antenna port numbers to
                second SRS resources of a second SRS resource
                set, wherein the first antenna port numbers of the
                first SRS resource set are mutually exclusive from
                the second antenna port numbers of the second
                SRS resource set, and
            an indication of a second set of layers associated
                with the second SRS resources; and
        receive, from a user equipment (UE), an uplink com-
            munication based at least in part on the first SRI or
            the second SRI.

12. The network node of claim 11,
wherein, to transmit the first SRI and the second SRI, the
    one or more processors are configured to:
    transmit a message that includes a first SRI field and a
        second SRI field, wherein the first SRI field includes
        the first SRI, and wherein the second SRI field
        includes the second SRI.

13. The network node of claim 12,
wherein the message comprises:
    downlink control information (DCI) that schedules the
        uplink communication.

14. The network node of claim 12,
wherein the one or more processors, to receive the uplink
    communication, are configured to:
    receive a first portion of the uplink communication via
        a first antenna port based at least in part on the first
        SRI; and
    receive a second portion of the uplink communication
        via a second antenna port based at least in part on the
        second SRI.

15. The network node of claim 11,
wherein the first SRS resource set is associated with a first
    beam, a first transmission configuration indicator (TCI)
    state, or a first UE antenna group, and
wherein the second SRS resource set is associated with a
    second beam, a second TCI state, or a second UE
    antenna group.

16. The network node of claim 14,
wherein the one or more processors, to receive the first
    portion of the uplink communication and the second
    portion of the uplink communication, are configured to:
    receive the first portion of the uplink communication
        and the second portion of the uplink communication
        using resources that overlap in time.

17. The network node of claim 11,
wherein the first antenna port numbers mapped to the first
    SRS resource set and the second antenna port numbers
    mapped to the second SRS resource set are indicated
    based at least in part on configuring the UE for one or
    more of:
    single-downlink control information (DCI)-based spa-
        tial division multiplexing communications,
    single-DCI-based single frequency network communi-
        cations,
    single-DCI-based frequency division multiplexing
        communications,
    multi-DCI-based multiple physical uplink shared chan-
        nel (PUSCH) communications, with two PUSCH
        communications, that are associated with different
        control resource set (CORESET) pool indexes or
        SRS resource sets, that are at least partially overlap-
        ping in time and frequency.

18. The network node of claim 11,
wherein the first antenna port numbers mapped to the first
    SRS resource set and the second antenna port numbers
    mapped to the second SRS resource set are indicated
    based at least in part on:
    the first antenna port numbers mapped to the first SRS
        resource set being indicated with both of a first
        antenna port number and a first SRS resource set
        index associated with the first SRS resource set, and
    the second antenna port numbers mapped to the second
        SRS resource set being indicated with both of a
        second antenna port number and a second SRS
        resource set index associated with the second SRS
        resource set.

19. The network node of claim 11,
wherein a channel over which a symbol on an antenna
    port used for uplink transmission is conveyed is infer-
    able from a channel over which another symbol on the
    same antenna port is conveyed based at least in part on
    transmissions being associated with a same SRS
    resource set, a same uplink beam, or a same transmis-
    sion configuration indicator (TCI) state.

20. The network node of claim 19,
wherein the channel over which the symbol on the
    antenna port used for uplink transmission is conveyed
    is inferable from the channel over which another symbol on the same antenna port is conveyed based at least in part on transmissions being associated with the same SRS resource set, the same uplink beam, or the same transmission configuration indicator (TCI) state based at least in part on the UE being configured for one or more of:

codebook (CB)-based physical uplink shared channel (PUSCH) communications in a spatial division multiplexing (SDM), a single frequency network (SFN), or a frequency division multiplexing (FDM) configuration, CB-based multiple PUSCH communications associated with different control resource set (CORESET) pool index values, non-CB (NCB)-based PUSCH communications for an FDM configured for two resource block sets, or NCB-based PUSCH communications for multiple PUSCH communications associated with different CORESET pool index values, the multiple PUSCH communications overlapping in time.

21. A method of wireless communication performed by a user equipment (UE), comprising:

receiving a first sounding reference signal (SRS) resource indicator (SRI) that includes:

a first mapping of first antenna port numbers to first SRS signal (SRS)-resources of a first SRS resource set, and an indication of a first set of layers associated with the first SRS resources;

receiving a second SRI that includes:

a second mapping of second antenna port numbers to second SRS resources of a second SRS resource set, wherein the first antenna port numbers of the first SRS resource set are mutually exclusive from the second antenna port numbers of the second SRS resource set, and an indication of a second set of layers associated with the second SRS resources; and transmitting an uplink communication based at least in part on the first SRI or the second SRI.

22. The method of claim 21, wherein receiving the first SRI and the second SRI comprises:

receiving a message that includes a first SRI field and a second SRI field, wherein the first SRI field includes the first SRI, and wherein the second SRI field includes the second SRI.

23. The method of claim 22, wherein transmitting the uplink communication comprises:

transmitting a first portion of the uplink communication via a first antenna port based at least in part on the first SRI; and transmitting a second portion of the uplink communication via a second antenna port based at least in part on the second SRI.

24. The method of claim 21, wherein the first SRS resource set is associated with a first beam, a first transmission configuration indicator (TCI) state, or a first UE antenna group, and wherein the second SRS resource set is associated with a second beam, a second TCI state, or a second UE antenna group.

25. A method of wireless communication performed by a network node, comprising:

transmitting a first sounding reference signal (SRS) resource indicator (SRI) that includes:

a first mapping of first antenna port numbers to first SRS resources of a first SRS resource set, and an indication of a first set of layers associated with the first SRS resources;

transmitting a second SRI that includes:

a second mapping of second antenna port numbers to second SRS resources of a second SRS resource set, wherein the first antenna port numbers of the first SRS resource set are mutually exclusive from the second antenna port numbers of the second SRS resource set, and an indication of a second set of layers associated with the second SRS resources; and receiving, from a user equipment (UE), an uplink communication based at least in part on the first SRI or the second SRI.

26. The method of claim 25, wherein transmitting the first SRI and the second SRI comprises:

transmitting a message that includes a first SRI field and a second SRI field, wherein the first SRI field includes the first SRI, and wherein the second SRI field includes the second SRI.

27. The method of claim 26, wherein receiving the uplink communication comprises:

receiving a first portion of the uplink communication via a first antenna port based at least in part on the first SRI; and receiving a second portion of the uplink communication via a second antenna port based at least in part on the second SRI.

28. The method of claim 25, wherein the first SRS resource set is associated with a first beam, a first transmission configuration indicator (TCI) state, or a first UE antenna group, and wherein the second SRS resource set is associated with a second beam, a second TCI state, or a second UE antenna group.

29. The UE of claim 1, wherein the second set of layers is different from the first set of layers.

30. The UE of claim 1, wherein the first set of layers and the second set of layers comprise a same set of layers.

* * * * *